United States Patent [19]
Gueziec et al.

[11] Patent Number: 6,016,153
[45] Date of Patent: *Jan. 18, 2000

[54] METHOD TO CONVERT NON-MANIFOLD POLYHEDRAL SURFACES INTO MANIFOLD SURFACES

[75] Inventors: Andre Pierre Gueziec, Mamaroneck; Gabriel Taubin, Hartsdale, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,001

[22] Filed: Apr. 24, 1997

Related U.S. Application Data

[63] Continuation of application No. 08/688,572, Jul. 30, 1996, Pat. No. 5,825,369.
[60] Provisional application No. 60/035,014, Jan. 15, 1997.
[51] Int. Cl.[7] .................................................... G06F 15/00
[52] U.S. Cl. ............................................................. 345/441
[58] Field of Search ................................... 345/441, 419, 345/420, 421, 433, 434, 435

[56] References Cited

U.S. PATENT DOCUMENTS 5,561,747 10/1996 Crocker et al. ......................... 345/419

OTHER PUBLICATIONS

"Surface Simplification with Variable Tolerance", Gueziec, Andre, MRCAS '95, Baltimore, MD, Nov., 1995, 4 pages.
"Geometric Compression Through Topological Surgery", Taubin, Gabriel et al., Computer Sciences, Jan. 16, 1996, 22 pages.
"Free–Form Shape Design Using Triangulator Surfaces", W. Welch and A. Witkin, Computer Graphics Proceedings, Annual Conf. Series, 1994, pp. 247–256.
"Curvature and Continuity Control in Particle–Based Surface Models", R. Szeliski, D. Tonnesen and D. Terzopoulos, SPIE, vol. 2031, Geometric Methods in Computer Vision (1993), pp. 172–181.
"CAD Data Repair", G. Butlin and C. Stops, FEGS Ltd., Oakington House, Oakington Cambridge CB4 5AF England, 1997.

*Primary Examiner*—Phu K. Nguyen
*Attorney, Agent, or Firm*—Jay P. Sbrollini, Esq.; Perman & Green, LLP

[57] ABSTRACT

A is a computer implemented method for converting a non-manifold surface to a manifold surface. The method includes the steps of (a) providing data in a memory of a computer for representing a non-manifold polyhedral surface comprised of a plurality of triangles each bounded by edges and having vertices; (b) analyzing the data to determine and record singular edges and singular vertices; and (c) cutting through the singular edges and singular vertices, and optionally other edges and vertices, to provide a plurality of connected polygonal surfaces that are free of singularities. The step of analyzing may include the initial steps of analyzing the data to remove isolated vertices and repeated triangles. The step of cutting operates in accordance with one of a local cutting method or a global cutting method, and may further include a step of stitching the cut surface along boundary edges.

35 Claims, 15 Drawing Sheets

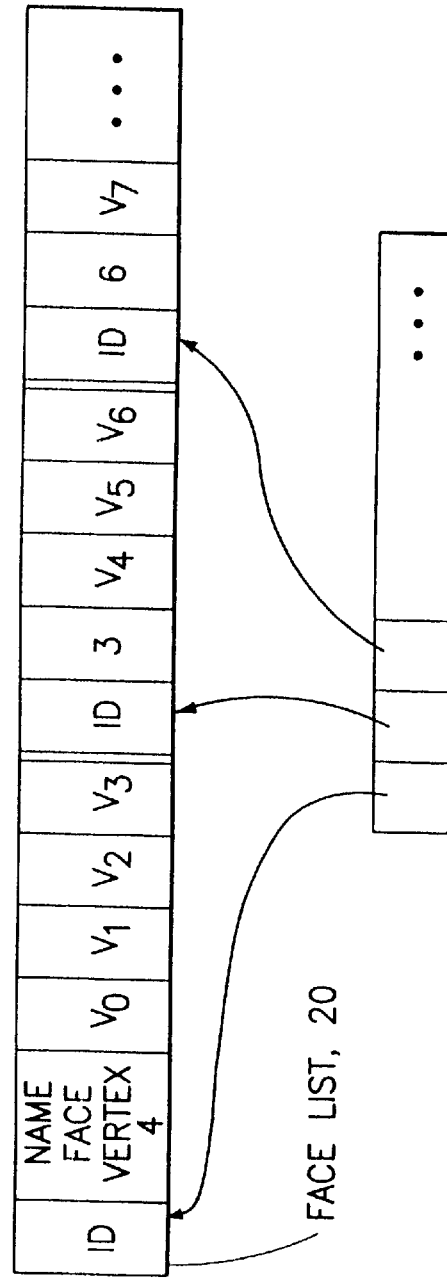

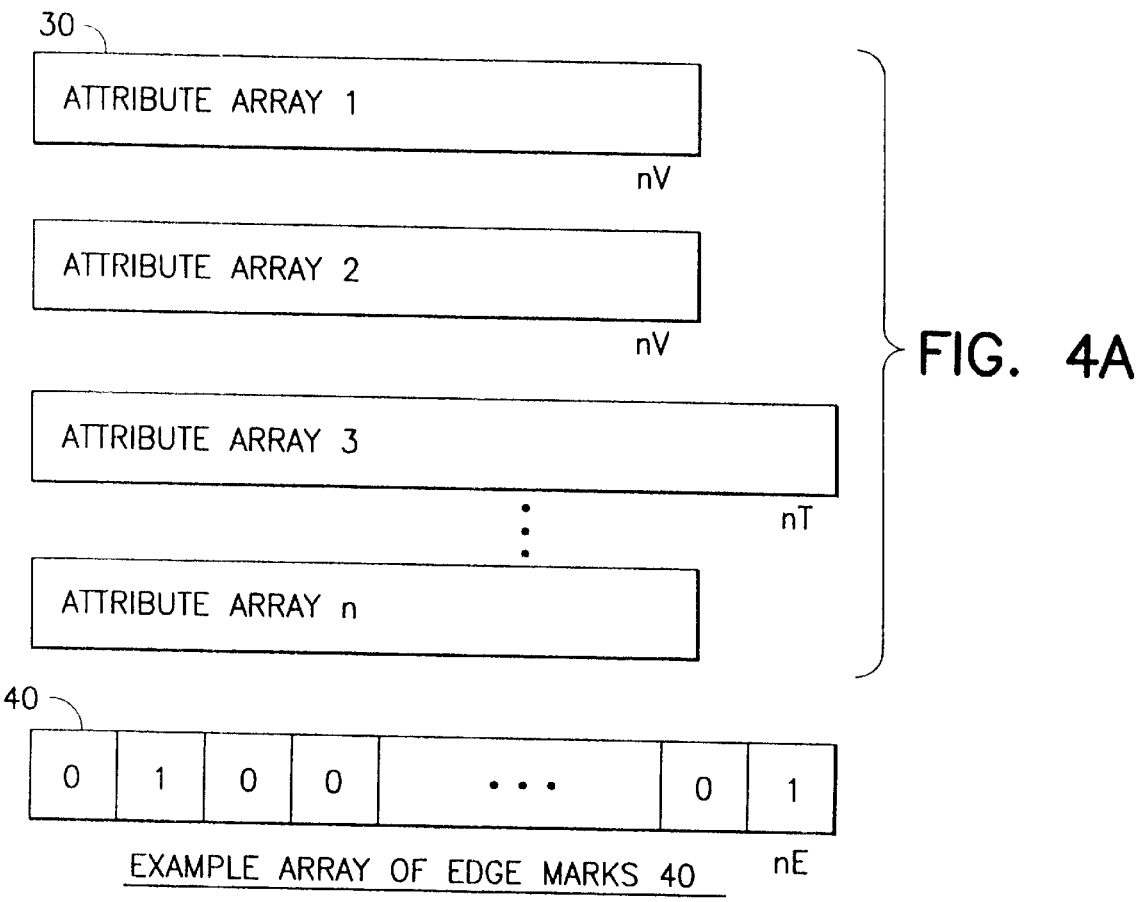

NON-STITCHABLE EDGE PAIR $(e_1, e_2)$

AN INVALID SEQUENCE OF STITCHES

RESULT OF STITCHING THE SEQUENCE OF EDGES IN FIG. 20A

CASE I

CASE II

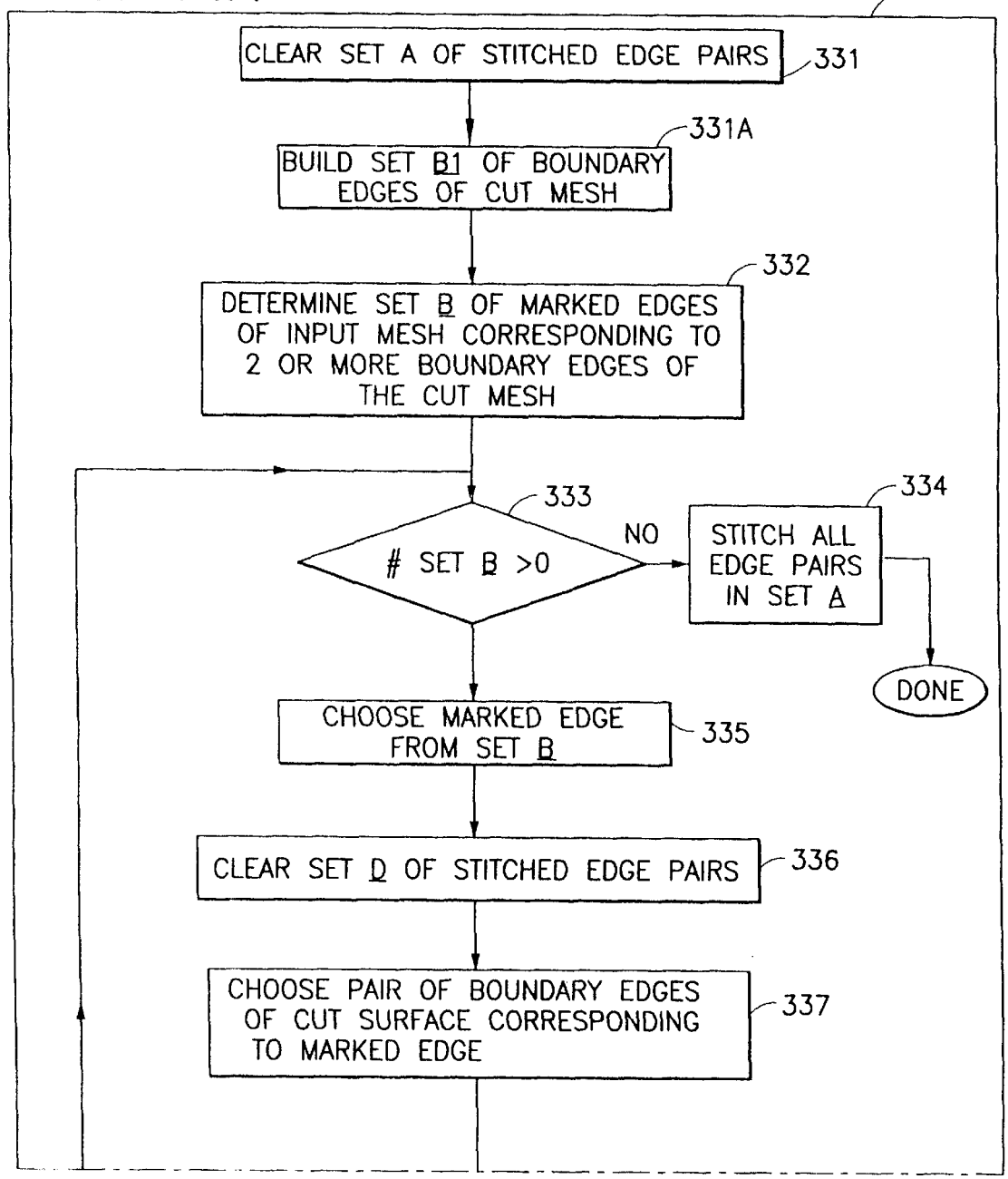

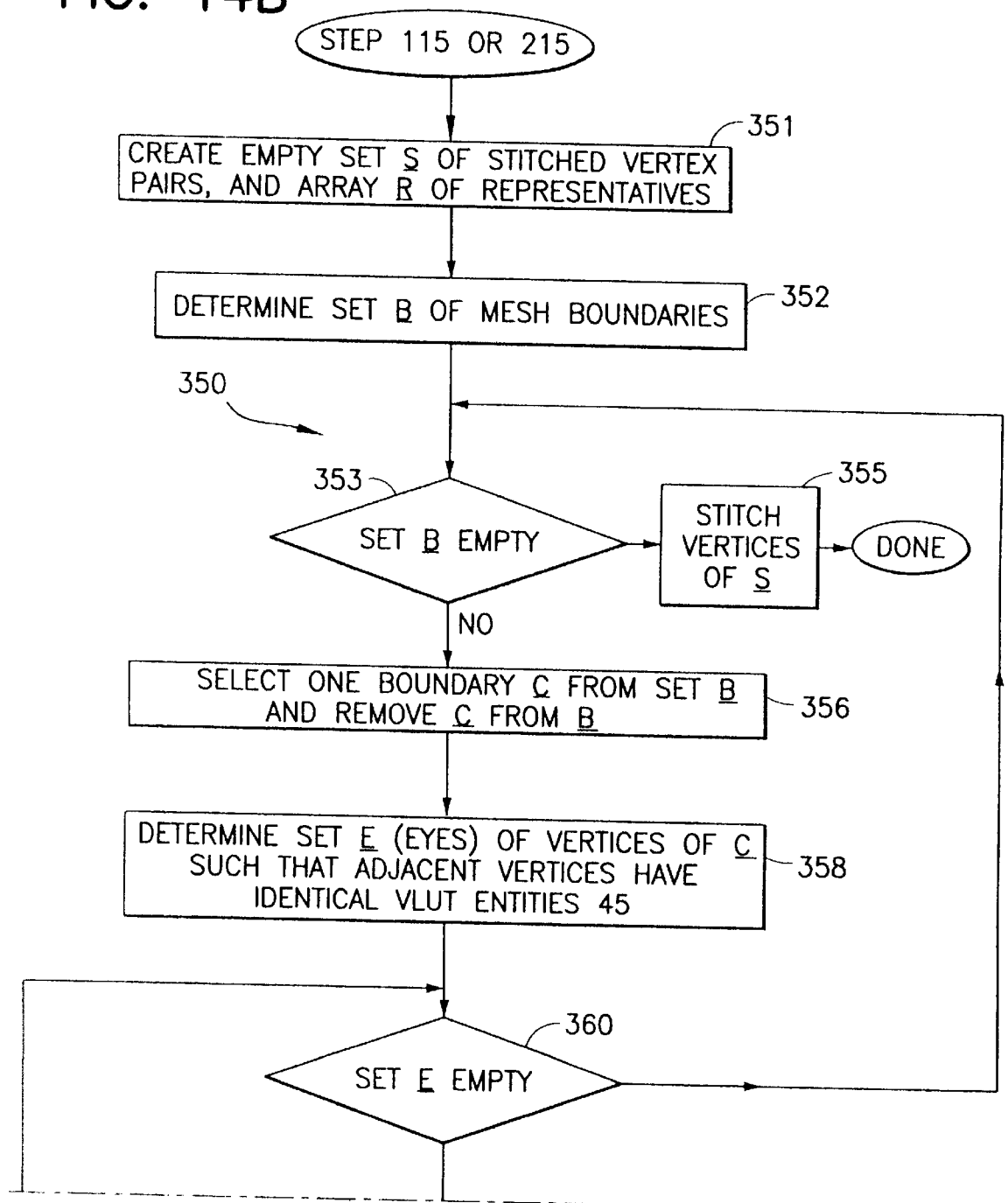

METHOD TO CONVERT NON-MANIFOLD POLYHEDRAL SURFACES INTO MANIFOLD SURFACES

CLAIM OF PRIORITY FROM A COPENDING PROVISIONAL APPLICATION

This patent application claims priority under 35 U.S.C. §1.119(e) from Provisional Patent Application No. 06/035,014, filed Jan. 15, 1997 with Express Mail Certificate No.: EM 138 442 120 US, entitled "Compressed Delta Surfaces" by G. Taubin et al., now expired, the disclosure of which is incorporated by reference herein in its entirety. This patent application also claims priority under 35 USC 120 for continuation from patent application Ser. No. 08/688,572 filed Jul. 30, 1996, now U.S. Pat. No. 5,825,369 entitled, "COMPRESSION OF SIMPLE GEOMETRIC MODELS USING SPANNING RESS" by J. Rossignac and G. Taubin, the disclosure of which is incorporated by reference herein in its entirety.

FIELD OF THE INVENTION

This invention relates to the field of computer graphics and, in particular, to methods for processing data representative of surfaces to be displayed.

BACKGROUND OF THE INVENTION

Polygonal surfaces form one of the major representations of three dimensional geometric models. Such surfaces consist of a plurality of polygons, which are cycles of vertices, whose coordinates are usually expressed in a local coordinate system. Such polygonal surfaces may be used for generating various images, pictures, and animations, and may also be used in CAD systems, in scientific visualization systems, and in medical imaging systems.

In general, polyhedral surfaces, such as surfaces represented as triangles, are commonly represented in a computer memory with a "vertex array" (with three floating point numbers per vertex) and a "triangle array" (with three indices into the vertex array per triangle). Very often this representation allows for the surface to be non-manifold, i.e., to have singular vertices and edges. A vertex is singular if its star (the set of triangles incident to the vertex) is not topologically equivalent (continuously deformed) to a closed disk. An edge is singular if it is shared by more than two triangles. However, many geometric algorithms and operations, such as compression, simplification, smoothing, and deformation operations, require the surface to be manifold.

There are a number of known algorithms that operate on polygonal surfaces including, but not limited to, the following.

(A) A first type of algorithms are those that produce two dimensional graphics for display on computer screens, for printing, or for other purposes. These algorithms are typically implemented using both software and hardware components.

(B) A second type of algorithms are those that compute surface characteristics (e.g. curvature, area).

(C) A third type of algorithms are those used for filtering, such as smoothing algorithms and other filtering algorithms.

(D) A fourth type of algorithms are those that perform finite element analysis for various engineering applications.

(E) A fifth type of algorithms are those that simplify surfaces, either because the surfaces are too large for current hardware to process in a reasonable period of time, or for efficiency purposes. In this context "simplifying" means approximating the surface with another surface that contains fewer polygons. An example of such a simplification algorithm is described in commonly assigned U.S. Patent Application entitled "Surface Simplification Preserving a Solid Volume and Respecting Distance Tolerances", Ser. No. 08/742,641, filed Nov. 1, 1996, by Andre P. Gueziec.

(F) A sixth type of algorithms are those used for surface subdivision, wherein surface subdivision is considered to be a technique for introducing new polygons into the surface so as to produce a result that resembles a smooth surface.

(G) A seventh type of algorithms are those used for surface compression, wherein surface compression is considered to be a technique to provide an efficient encoding of polygons defining the surface. An example of a surface compression algorithm is described in commonly assigned U.S. Patent Application entitled "Compression of Simple Geometric Models Using Spanning Trees", Ser. No. 08/688,572, filed Jul. 30, 1996, by Jarek J. R. Rossignac and Gabriel Taubin.

Most available algorithms of the foregoing categories, with the exception of the first category (A), require that the surface be a manifold surface. To understand the concept of a manifold surface one can consider a solid object, and the surface bounding that solid object. The bounding surface is a manifold surface, together with surfaces obtained after cutting a series of holes in the original surface. A precise definition of a surface, and of a manifold surface, are given below.

The following three situations can arise when an algorithm that requires that the surface be a manifold surface is instead presented with a surface that is not a manifold surface.

(A) The algorithm can include a method for rejecting the presented surface. However, there is an additional cost incurred in designing and implementing the input surface rejection method.

(B) The algorithm may not recognize that the presented surface is a non-manifold surface, but safeguards allow the computer program implementing the algorithm to terminate properly, without performing the original function of the algorithm. In this case there is an additional cost incurred in designing and implementing the safeguards.

(C) Finally, the computer program implementing the algorithm may simply terminate abnormally. This latter case is undesirable for a number of reasons.

Conventional methods for converting non-manifold surfaces to manifold surfaces include three techniques, described by Szeliski et al. "Curvature and Continuity Control in Particle-Based Surface Models", Proceedings of SPIE "Geometric Methods in Computer Vision II", Vol 2031-15, July 1993, pp.172–181, by Welch and Witkin "Free-Form Shape Design Using Triangulated Surfaces", Proceedings of ACM SIGGRAPH'95, July 1994, pp.247–256, and by Butlin et al. "CAD Data Repair", in 5th International Meshing Roundtable, Pittsburgh, Pa., October 1996.

The technique of Szeliski et al. builds a new polygonal surface from an existing surface by defining a collection of point samples, using point repulsion methods to distribute the points evenly. Subsequently, a surface triangulation of the remaining points is found by extending the techniques of Delaunay triangulations to surfaces. Delaunay triangulations are discussed by O'Rourke in "Computational geometry in C", Cambridge University Press, 1994. The method of Szeliski et al. produces surfaces that are manifolds, but at the expense of discarding the original surface geometry (vertex positions) and connectivity (triangles or polygons), by defining entirely new vertices and triangles. Furthermore, the triangulation method employed is a heuristic method that most likely does not apply in all cases.

The technique of Welch et al. builds a polygonal surface starting from a simple surface, by applying a series of surface operations that consist of adding, deleting, or morphing a portion of the surface. This technique uses methods similar to Szeliski et al. for building triangulations of the surface points. Surface or mesh cutting techniques are also used, but the mesh cutting techniques cut only along simple curves, and are not capable of multiplying vertices at complex curve intersections.

The technique of Butlin et al. is directed towards the conversion of CAD data. This technique is interactive and requires user assistance, and automatic methods for detecting and converting vertices where non-manifold situations occur are not described.

None of the prior art techniques known to the inventors solve the problem of the automatic conversion of a non-manifold surface to a manifold surface. The first two conventional techniques modify the surface vertices and polygons. However, the goal should be to convert the surface while maintaining the vertex coordinates and attributes. Another goal should be to perform the conversion automatically, which is not achieved by the third above-referenced technique.

There is thus a long felt need to overcome these and other problems of the prior art and to provide an efficient and automatic conversion of non-manifold polyhedral surfaces to manifold polyhedral surfaces.

OBJECTS OF THE INVENTION

It is a first object of this invention to provide a method for the efficient conversion of three dimensional geometric models to manifold models which can be processed with a wide range of algorithms and methods, including geometric compression algorithms, geometric simplification (approximation) algorithms, smoothing algorithms, and various other algorithms.

A further object of this invention is to provide a system and method for cutting a surface through a set of edges, using one of a local method and a global method.

Another object of this invention is to provide a system and method for automatically converting a non-manifold mesh into a manifold mesh, optionally into an orientable mesh, in order to satisfy the input requirements of algorithms that require that a manifold surface be presented for processing.

SUMMARY OF THE INVENTION

The foregoing and other problems are overcome and the objects of the invention are realized by methods and apparatus in accordance with embodiments of this invention.

Computer implemented methods are disclosed for converting a non-manifold surface to a manifold surface. In the ensuing description the word "mesh" is used to denote surfaces. The computer uses a data structure that contains a list of vertices and a list of faces. Additional arrays are used to store various vertex or triangles attributes.

In a first aspect the invention provides a method to remove isolated vertices by counting a number of triangles incident to each vertex to obtain a vertex valence. This is preferably accomplished by using an array of integers with one entry per vertex, which may be referred to as a vertex valence array. All the entries of the vertex valence array are first initialized to zero. Then, for each one of the three indices of each triangle, the corresponding entry in the array is incremented. After all the triangles have been considered, the isolated vertices are identified as those with zero valence. New consecutive indices are assigned to the non-isolated vertices by means of a look-up table, and the triangle indices are replaced by the corresponding look-up table entries.

Multiple triangles are removed by sorting, in increasing order, the three vertex indices within each triangle. Then the triangles are sorted in increasing lexicographic order. Finally, repeated triangles are removed from the sorted triangle array. In addition, triangles having one or more invalid vertex indices are removed.

As employed herein an edge is considered to be an unordered pair of vertex indices, such that both indices belong to at least one triangle. Each triangle is said to be incident to each one of its three edges. An edge is referred to as a boundary edge if it has only one incident triangle, a regular edge if it has exactly two incident triangles, and a singular edge if it has three or more incident triangles. The method counts the number of triangles incident to each edge, the edge label, by using an array of integers with one entry per edge, an edge label array. Then, for each one of the three edges of each triangle, the corresponding entry in the edge label array is incremented. During this process the indices of up to two incident triangles per edge are also stored for future use. For the case of boundary or singular edges, the corresponding indices are ignored.

A vertex is considered to be a singular vertex if it is an end point of a singular edge, or if its triangle star (i.e., set of triangles that include the vertex index) has more than one connected component, with two triangles being connected if they share a regular edge. The two indices of triangles incident to each regular edge that were previously stored are used for determining if singular vertices are present.

Subsequently cutting through singular edges and vertices creates a new surface with more vertices and the same number of triangles. The new surface does not contain any singular vertices, but several vertex indices of the new surface correspond to each index of a singular vertex of the original surface. The regular vertices of both surfaces are in one-to-one correspondence. Some entries of some of the triangles incident to singular vertices must be modified as well. The multiplicity of a vertex of the original surface is the number of vertices of the new surface that correspond to it. To construct the new surface the multiplicities of the singular vertices are determined. To determine the multiplicities of the singular vertices each vertex star is partitioned into connected components, with two triangles being connected if they share a regular edge. The two indices of triangles incident to each regular edge that had been stored in a previous step are used for this purpose.

Vertex multiplicities are counted as follows. The multiplicity of a singular vertex is the number of different connected components of the vertex star.

In order to multiply vertices the following steps are executed. The total number of vertices of the new surface is equal to the sum of the multiplicities of the vertices of the original surface. A new vertex list and new triangle list are created according to a local or global cutting method. The new surface, described by the new vertex array and by the modified triangle array of the original surface, does not contain any singular vertices or edges.

At this point in the method cuts have been made through the polygonal surface, creating several connected polygonal surfaces that satisfy the manifold property. To orient the polygonal surfaces, the method builds a rooted spanning tree in the graph whose vertices are the mesh faces and whose edges are the non-marked regular edges. The method traverses the spanning tree starting from the root and re-orients child faces consistently with their parent face. Re-orienting a face is performed by inverting the vertex cycle order for the face in the face list.

As a consequence of this operation, the polygonal surfaces are arbitrarily oriented. If desired, the method can reverse the orientation of a particular polygonal surface by reversing all of its triangles, thereby providing an oriented manifold surface.

This invention thus teaches a computer implemented method for automatically converting a non-manifold surface to a manifold surface. The method includes the steps of (a) providing data in a memory of a computer for representing a non-manifold polyhedral surface comprised of a plurality of triangles each bounded by edges and having vertices; (b) analyzing the data to determine and record singular edges and singular vertices; and (c) automatically cutting through all of the singular edges and singular vertices, and possibly other designated edges, to provide a plurality of connected polygonal surfaces that are free of singularities. The step of analyzing may include the initial steps of analyzing the data to remove isolated vertices and repeated triangles. The step of cutting operates in accordance with one of a local cutting method or a global cutting method, and may further include a step of stitching or joining the surfaces along boundary edges.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 is a pictorial illustration of a list of faces used by the preferred embodiment of the present invention;

FIG. 4A is a pictorial illustration of attribute arrays used by the method of this invention;

FIG. 4B is a pictorial illustration of an array of edge marks 40;

FIG. 4C is a pictorial illustration of an exemplary vertex look up table (VLUT);

FIG. 4D is a pictorial illustration of another exemplary VLUT;

DETAILED DESCRIPTION OF THE PREFERRED EMBODIMENTS

For the purposes of this patent application a surface or mesh is defined as a set of vertices V and a set of polygons P. Each vertex of V has n-dimensional coordinates (commonly three dimensional coordinates). Each polygon of P is a cycle of different vertices. One requirement for the definition of a surface is that the vertices of a polygon all lie on the same plane. An orientation of the polygon is defined by choosing an order for the vertices in the cycle, modulo circular permutation. Two such orderings are possible. An undirected surface edge is a pair of consecutive vertices in any polygon. The polygon is said to be incident to the edge, and the edge incident to the vertices. Two polygons sharing an edge are said to be adjacent. Two edges sharing a vertex are said to be adjacent. If nV is the number of vertices of the surface (of the set V), nF is the number of faces (number of elements in P), and nE the number of edges, the Euler number of the surface is defined as nV−nE+nF.

This invention is described primarily in the context of polygons that are triangles, although the use of triangles is not a limitation upon the practice of this invention.

A manifold surface must satisfy the following first condition: (a) two polygons can only intersect at a vertex of each of them, (b) or at an edge of each of them. The method of this invention does not enforce this first condition.

Figure 1A:
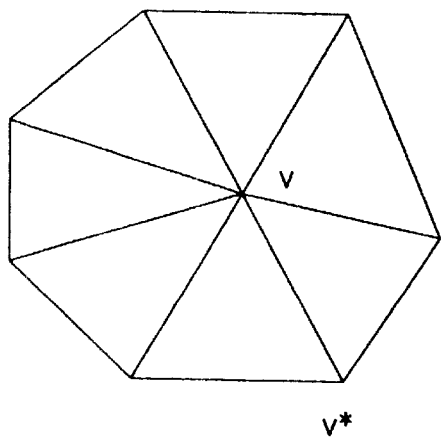
FIG. 1A is a pictorial representation of the star of a regular vertex.
Figure 1B:
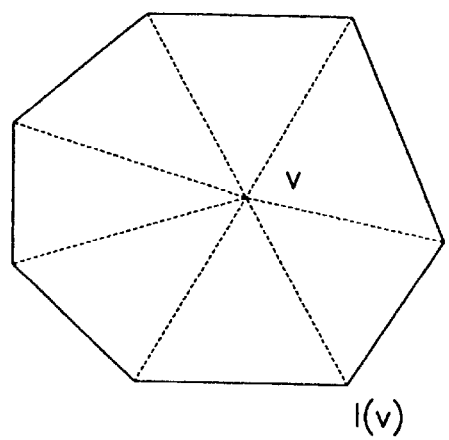
FIG. 1B is a pictorial representation of the link of a regular vertex.
Figure 1C:
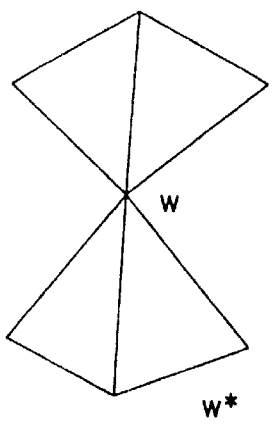
FIG. 1C is a pictorial representation of the star of a singular vertex.
Figure 1D:
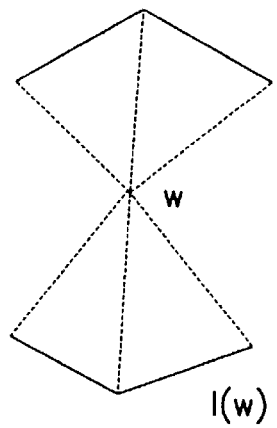
FIG. 1D is a pictorial representation of the link of a singular vertex.
Figure 1E:
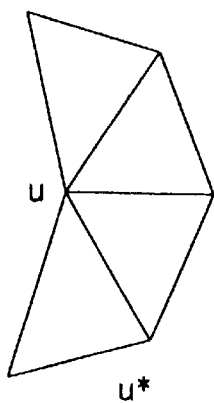
FIG. 1E is a pictorial representation of the star of a boundary vertex.

Herein the set of polygons that share a vertex v are referred to as the star of v. The star of a vertex is illustrated in FIG. 1A, FIG. 1C and FIG. 1E. The number of polygons in the star of a vertex v is referred to herein as the valence of the vertex v. The link of a vertex v is obtained by linking up all edges bounding the star of v, and by discarding from the list of edges so formed the edges incident to v. The link of a vertex is illustrated in FIG. 1B and FIG. 1D. The link of a vertex is also defined by C. Hoffmann, "Geometric and Solid Modeling", Morgan Kaufmann, 1989, pp. 53–54. If the link has one component, and is not intersecting itself, the vertex v is said to be a regular vertex (illustrated in FIG. 1A, FIG. 1B and FIG. 1E), otherwise it is a singular vertex, illustrated in FIG. 1C and FIG. 1D. For such a regular vertex, if the link is closed, meaning the first end point of the first edge of the link is the same as the last end point of the last edge, the vertex is an interior regular vertex (see FIG. 1A and FIG. 1B), otherwise it is a boundary vertex (see FIG. 1E).

A second condition that a manifold surface must satisfy is that every vertex should be a regular vertex. This second condition implies that a particular edge can be shared by, at most, two faces. The method of this invention specifically enforces this second condition.

A manifold surface is considered to be orientable if each polygon can be oriented such that each edge shared by two polygons is listed in the opposite vertex order in the two polygon vertex cycles. The surface is oriented if each polygon is oriented, and if the surface is orientable with such polygon orientations.

A simple undirected graph is defined as a set of vertices and a set of edges, whereby each edge is a pair of different vertices. Such a graph is said to be imbedded on a surface if edges can be drawn on the surface such that no two edges will intersect in a location different from a common end point of the edges.

This teaching of this invention applies to a simple imbedded graph, which is more general than a polyhedral surface, since the faces associated with the simple imbedded graph are not necessarily planar. In this case, the method still employs a specification of a set V and a set P, but the requirement that the vertices of each polygon lie on a plane is not enforced.

In the following the word "mesh" is used to denote a simple imbedded graph, on a surface of any topological type (meaning, with any Euler number), that is used as an input for the method of this invention.

Figures 2, 14A:
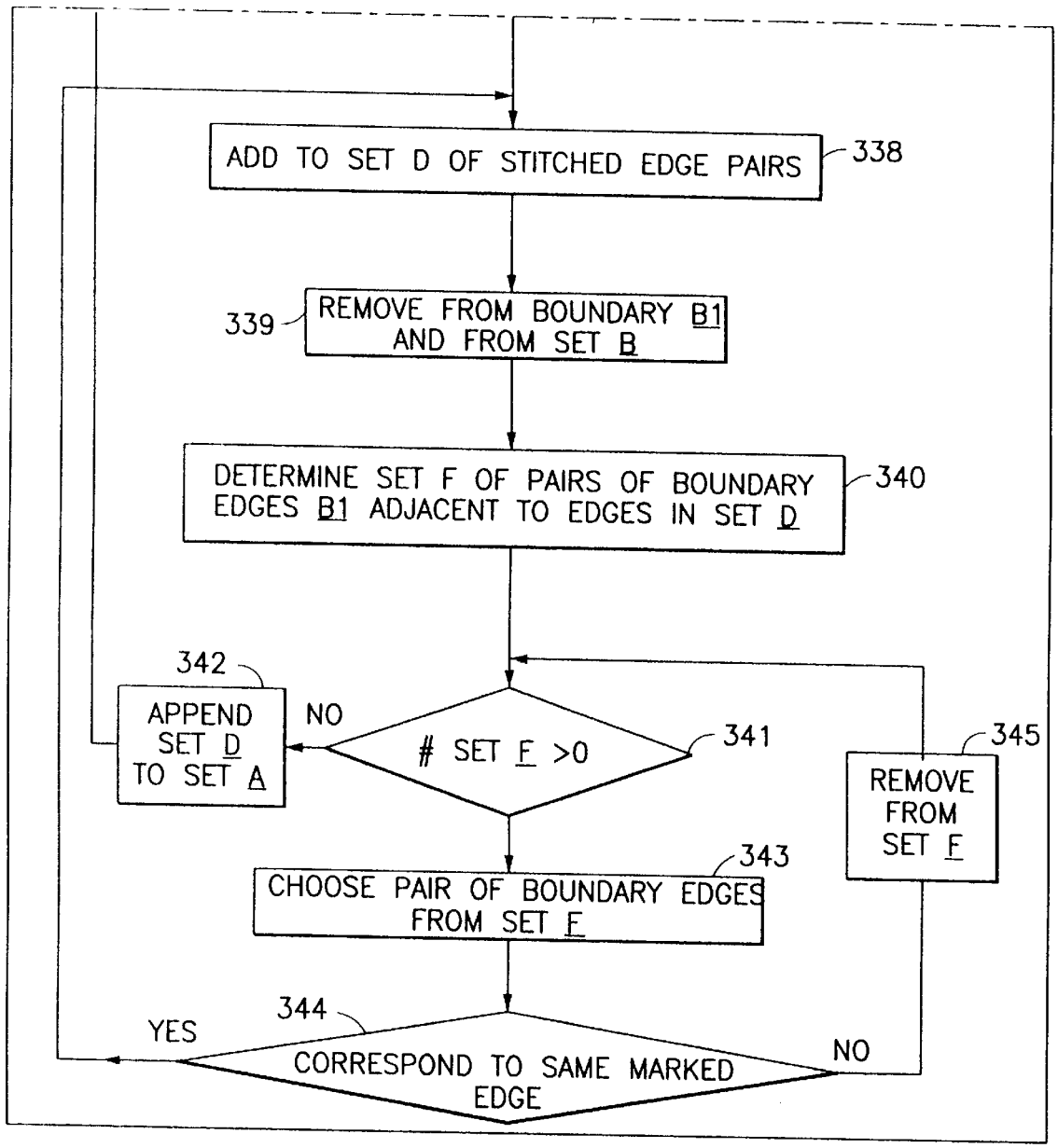
FIG. 2 is a pictorial illustration of a list of vertices used by a preferred embodiment of the present invention.
FIG. 14A is a flow chart illustrating a method for stitching through the boundary edges of a manifold surface.

A mesh is preferably represented in computer memory as a list of vertices 10, i.e., a vertex list (see FIG. 2), and a list of polygons 20, also denoted by a list of faces, i.e., a face list 20 (see FIG. 3). Preferably, such lists are represented in the computer memory as directly indexed arrays. Each vertex entry in the vertex list preferably contains three coordinates of the vertex, stored in floating point format using the required precision level (single precision or double precision). In addition, vertices may be associated with several attributes, such as vertex colors, normals, texture coordinates, material properties, errors, tolerances, or other scalar or vector data. Such attributes are preferably stored as separate attributes arrays 30 (see FIG. 4A), with one array for each attribute. Each vertex has an ID in the vertex list, that is preferably implicitly determined as the order in which it is encountered when serially visiting the list.

A face list preferably comprises, for each face, the number of face vertices and the list of indices of the face vertices. Such indices are preferably vertex IDs, and preferably the indices are ordered circularly when visiting the face. An example of a face list is given below in Step 150. In addition, it is preferred to use a face cycle table 25 (see FIG. 3), that contains for each face the index to the beginning of the face description in the face list 20.

The additional arrays 30 are used to store various vertex or triangle attributes.

Figure 5:
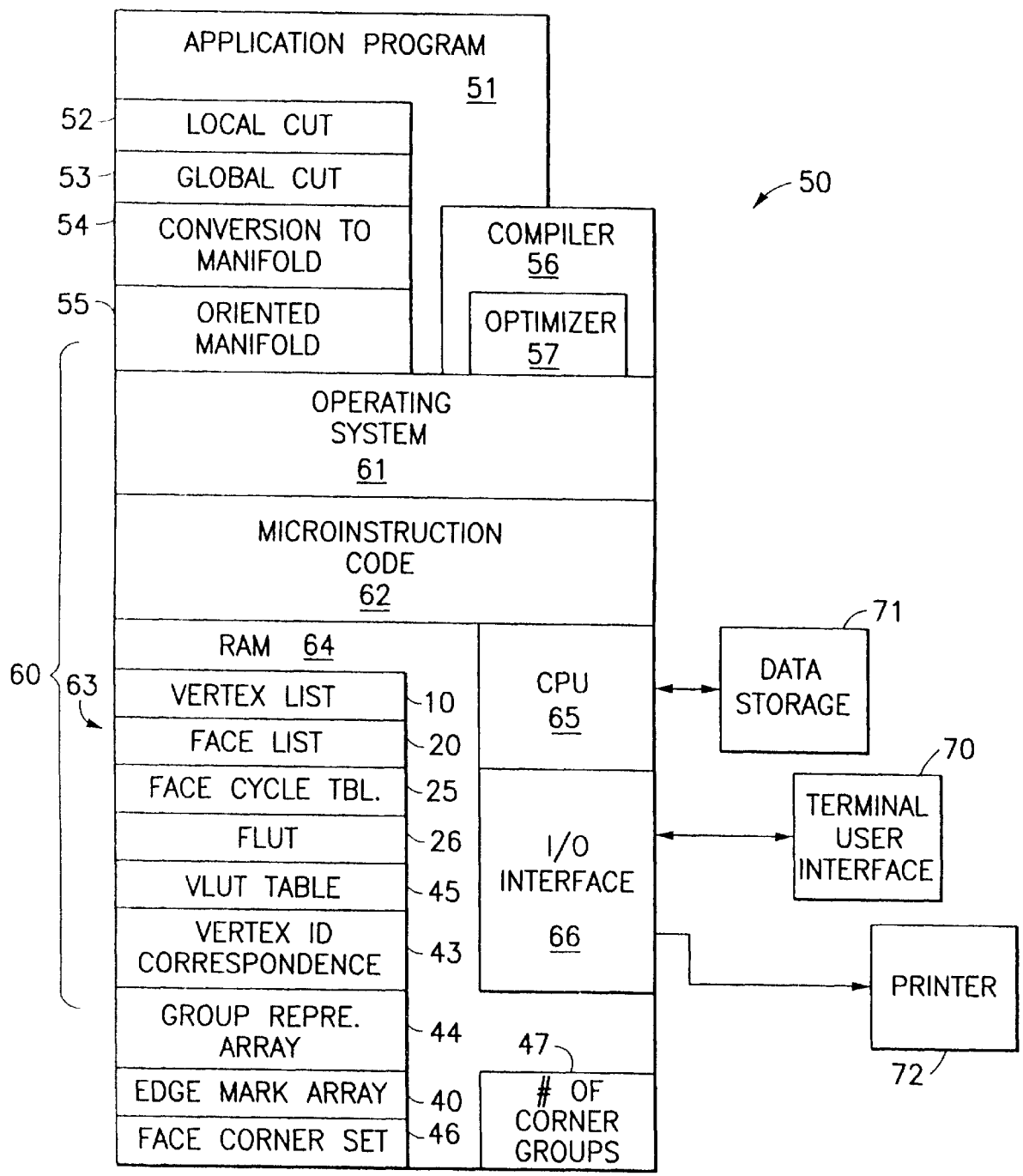
FIG. 5 is a block diagram showing a computer system on which a preferred embodiment of the present invention operates.

FIG. 5 is a block diagram showing an exemplary computer system 50 on which preferred embodiments of the methods of this invention operate. The preferred embodiment includes one or more application programs 51. One type of application program 51 is a compiler 56 which includes an optimizer 57. The compiler 56 and optimizer 57 are configured to transform a source program (such as other application programs 51) into optimized executable code. More generally, the source program is transformed to an optimized form and then into executable code. The compiler 56 and optimizer 57 operate on a computer platform 60 that includes a hardware unit 63. Some application programs 51 that run on the system 50 include, in accordance with this invention, a local mesh cutting process 52, a global mesh cutting process 53, a conversion to manifold process 54, and a conversion to oriented manifold process 55, each of which is described in detail below.

The hardware unit 63 includes one or more central processing units (CPU) 65, a random access memory (RAM) 64, and an input/output interface 66. Microinstruction code 62, for instance a reduced instruction set, may also be included on the platform 60. Various peripheral components may be connected to the computer platform 60, including a graphical interface or terminal and user interface 70, a data storage device 71, and a printing device 72. An operating system 61 coordinates the operation of the various components of the computer system 50. An example of computer system 50 is the IBM RISC System/6000 (RISC System/6000 is a trademark of the International Business Machines Corporation.) It is readily understood that those skilled in the computer arts will be familiar with many equivalent computer systems 50, and the teachings of this invention are not intended to be limited for use with any one particular type of computer or computer architecture.

The system of RAM memory 64 is shown containing a plurality of tables and arrays which are employed during the operation of the methods of this invention. It should be realized that these tables and arrays could as well be maintained in the data storage unit 71, or on both the RAM 64 and data storage unit 71.

An aspect of this invention is a computer method for converting a mesh to a manifold mesh. The computer method comprises the following high level preprocessing steps and processing steps.

Preferably, a first preprocessing step identifies all faces that are not polygons in accordance with the definition given above: if vertices are repeated in the cycle, such polygons are split into several polygons with non-repeated vertices. When polygons contain repeated vertices but cannot be split, such vertices are multiplied as explained in Step 160 of FIG. 11. Also, in the cycle of vertices specifying a particular polygon, it is possible that a particular vertex index will be invalid, meaning that the vertex index is less than zero or larger than or equal to the number of vertices nV. Any polygons determined to be incident to invalid vertices are removed from the list of polygons.

In a second, optional preprocessing step, duplicate polygons are identified as described above and, for each duplicate, a single copy of the polygon is retained. In greater detail, multiple polygons are removed by sorting, in increasing order, the vertex indices within each polygon. Then the polygons are sorted in increasing lexicographic order. Finally, repeated or duplicate polygons are removed from the sorted polygon array.

After both preprocessing steps are executed, a face lookup table (FLUT) 26 may be created. The FLUT 26 provides, for each face in the face list 20 that results from the preprocessing steps, the index to the corresponding face in the original list of faces.

In a third, optional preprocessing step, vertices that are not referenced by any face may be removed from the vertex list 10. Preferably, the valence of each vertex is computed by initializing the valence to zero and by looping through the face list 20 and incrementing by one the valence of each vertex in a face cycle. This is preferably accomplished by using an array of integers with one entry per vertex, which may be referred to as a vertex valence array. Vertices with a valence of zero are determined to not be referenced, and are removed from the vertex list 10. Subsequently, new vertex IDs are assigned to the remaining vertices, preferably by looping through the new vertex list 10 and by assigning to each vertex an index corresponding to its order of occurrence in the vertex list 10. The correspondence between new vertex IDs and previous vertex IDs is stored in a vertex VLUT table 45, that has one entry for each new vertex. The correspondence between old vertex IDs and new vertex IDs is temporarily stored in a vertex ID correspondence table 43 that has one entry for each previous vertex. Then, for each face cycle in the face list 20, the method queries the new vertex ID in the vertex ID correspondence table 43, and replaces the previous vertex ID with the new vertex ID in the face cycle. Preferably the vertex correspondence table 43 is deleted after the face list 20 has been processed.

Having completed the preprocessing step(s), in a first processing step a list of edges is determined for the mesh, and each edge is classified as either a regular edge, a boundary edge, or a singular edge. An array of marked edges 40 (FIG. 4B) is initialized such that each entry is equal to zero. For each singular edge, a value of one is entered in the array of marked edges 40. optionally, other regular and boundary edges chosen by the user of the algorithm can be marked and identified by a one in the array of marked edges 40. This can be accomplished, for example, by the user employing the terminal/user interface 70 of FIG. 5 to select and designate certain edges.

In a second step 100 (FIG. 11) or 200 (FIG. 12) the mesh is cut along marked edges using either a local or a global cutting method.

In a third step 330 (FIG. 14A) or 350 (FIG. 14B) the resulting mesh is stitched or joined along boundary edges. The second step 100 or 200 of the present invention can be applied to any mesh for the purpose of performing a cut along a set of edges. In this case the user first manually specifies the list of marked edges 40 where the user wishes to cut the mesh. Hereinafter a "cut mesh" refers to the result of the cutting operation.

LOCAL CUTTING METHOD

Figure 11:
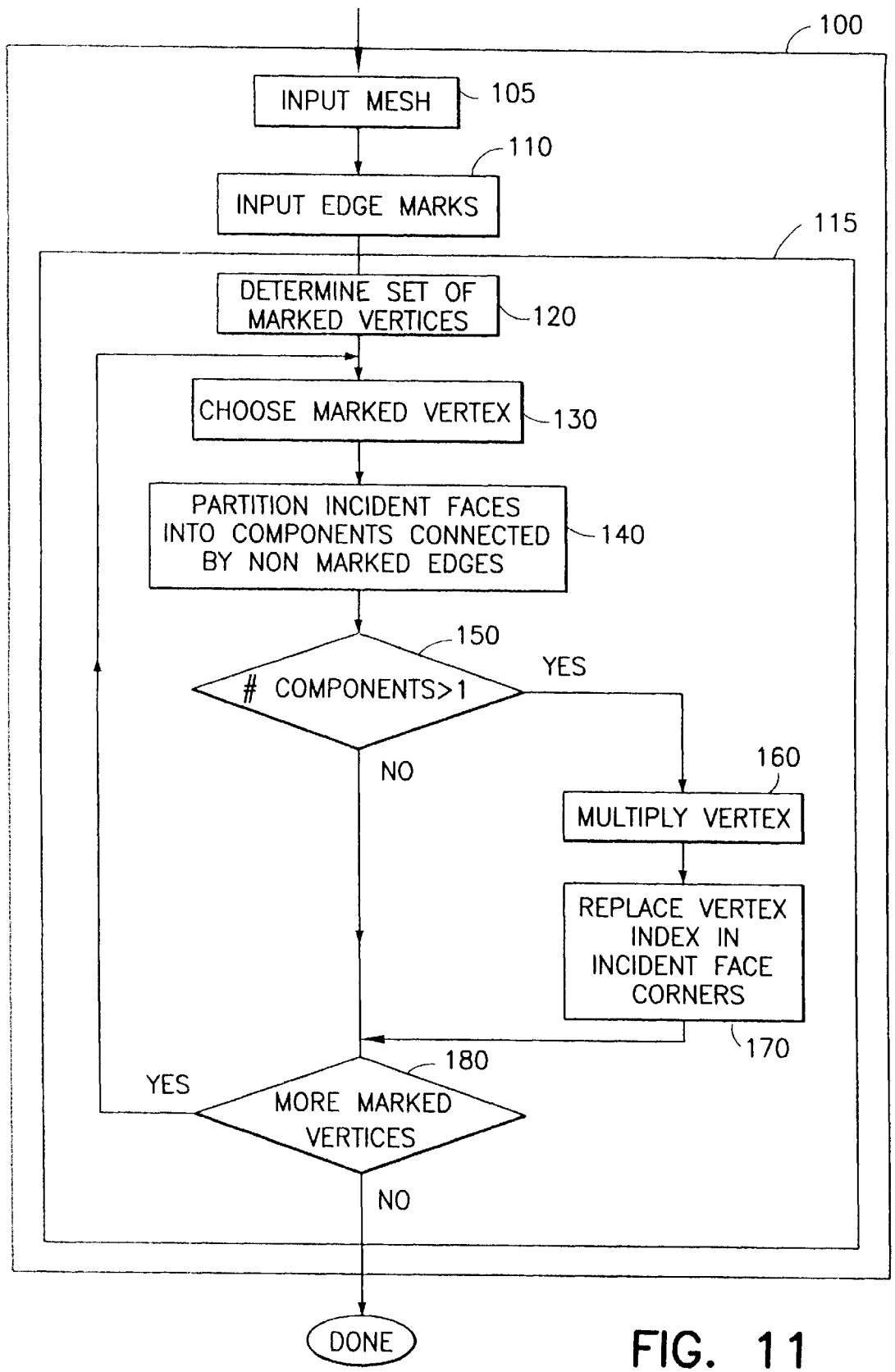
FIG. 11 is a flow chart illustrating a local method for cutting a mesh through a set of edges.

Referring to FIG. 11, in Step 100 a local method is employed for cutting a mesh through a set of edges. A local cutting method is defined to be a method that does not necessarily operate on each vertex of the set V, nor on each face of the set P.

In Step 105 the mesh is read into the computer memory 64, 71. In Step 110 the method inputs edge marks in the array of edge marks 40. As was described above, the edge marks are represented as a field of binary values (zero and one). The value one indicates that the edge is marked. The value zero indicates that the edge is not marked. Marked edges can be arbitrarily chosen by the user; and can also automatically be identified as singular edges as explained subsequently in Step 310 of FIG. 13; or they can be a combination of chosen edges and singular edges.

In Step 115 the method cuts through the marked edges. Step 115 comprises as sub-steps all steps numbered as larger than 115 and lower than 200, as shown in FIG. 11.

First, in Step 120 the method determines a set of marked vertices. A first method for marking vertices is to visit the set of marked edges and to mark both vertices to which marked edges are incident, followed by a second method that marks all vertices whose stars consist of more than one component.

In Step 130, the method selects a particular vertex from the set of marked vertices, and in Step 140 retrieves the sub-list of the list of faces 20 corresponding to faces incident to the selected marked vertex.

Figure 15:
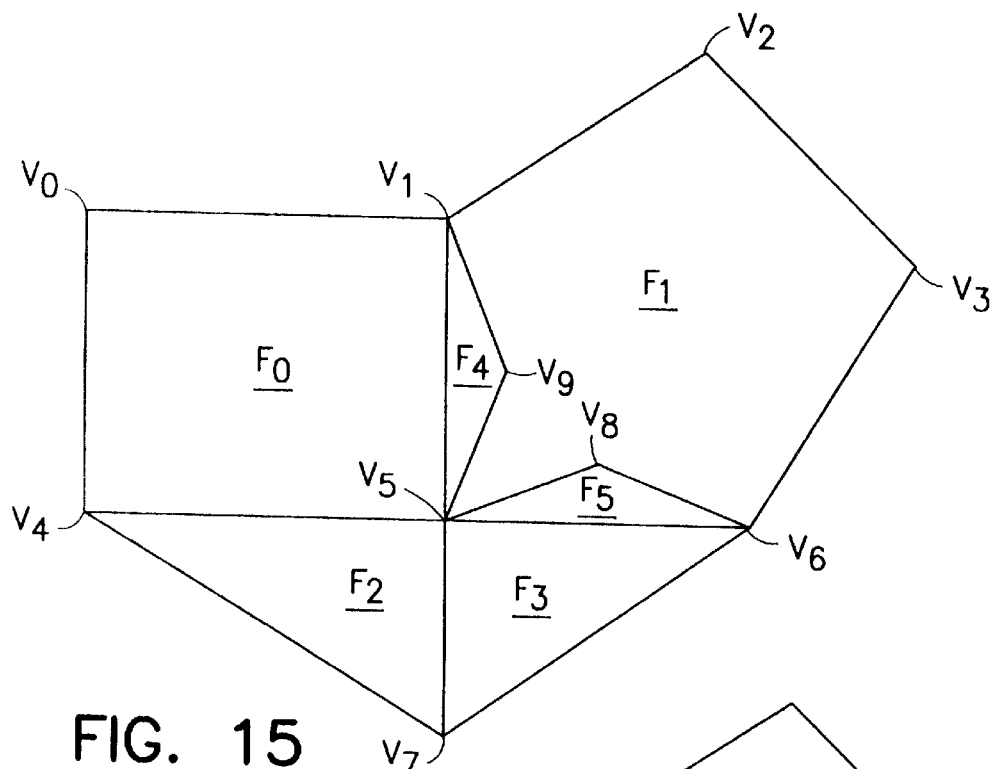
FIG. 15 is a pictorial representation of the star of a marked vertex before Steps 140 to 170 of FIG. 11 are executed.

For explanatory purposes, reference is made to FIG. 15. Assume that vertex v5 is selected as a marked vertex. In this case f0, f1, f2, f3, f4, f5 and f6 are the faces incident to v5: such faces form the star of the vertex v5. Also in this case v0, v1, v2, v3, v4, v5, v6, v7, v8 and v9 are the vertices to which the faces f0, f1, f2, f3, f4 and f5 are incident. Such vertices correspond to the complete list of vertices that belong to the star of v5.

The face list 20 contains the vertex IDs of the vertices belonging to each face. For the configuration of FIG. 15, the corresponding face list is as follows:

f0: v0, v4, v5, v1
f1: v1, v5, v6, v3, v2
f2: v4, v7, v5
f3: v5, v7, v6
f4: v1, v5, v9
f5: v5, v6, v8

For convenience, the face vertices have been listed in counter-clockwise order, but their actual order can be either clockwise or counter-clockwise.

Further, assume that edges (v2,v5) and (v5,v6) belong to the list of marked edges. The four non-marked edges incident on v5 are:

(v5,v4)
(v5,v7)
(v5,v8)
(v5,v7)

Returning again to FIG. 11, in Step 150 the method then partitions such faces into components that are connected by non-marked edges. For example. the partition of faces into groups for the configuration of FIG. 15 is done as follows.

Figure 16:
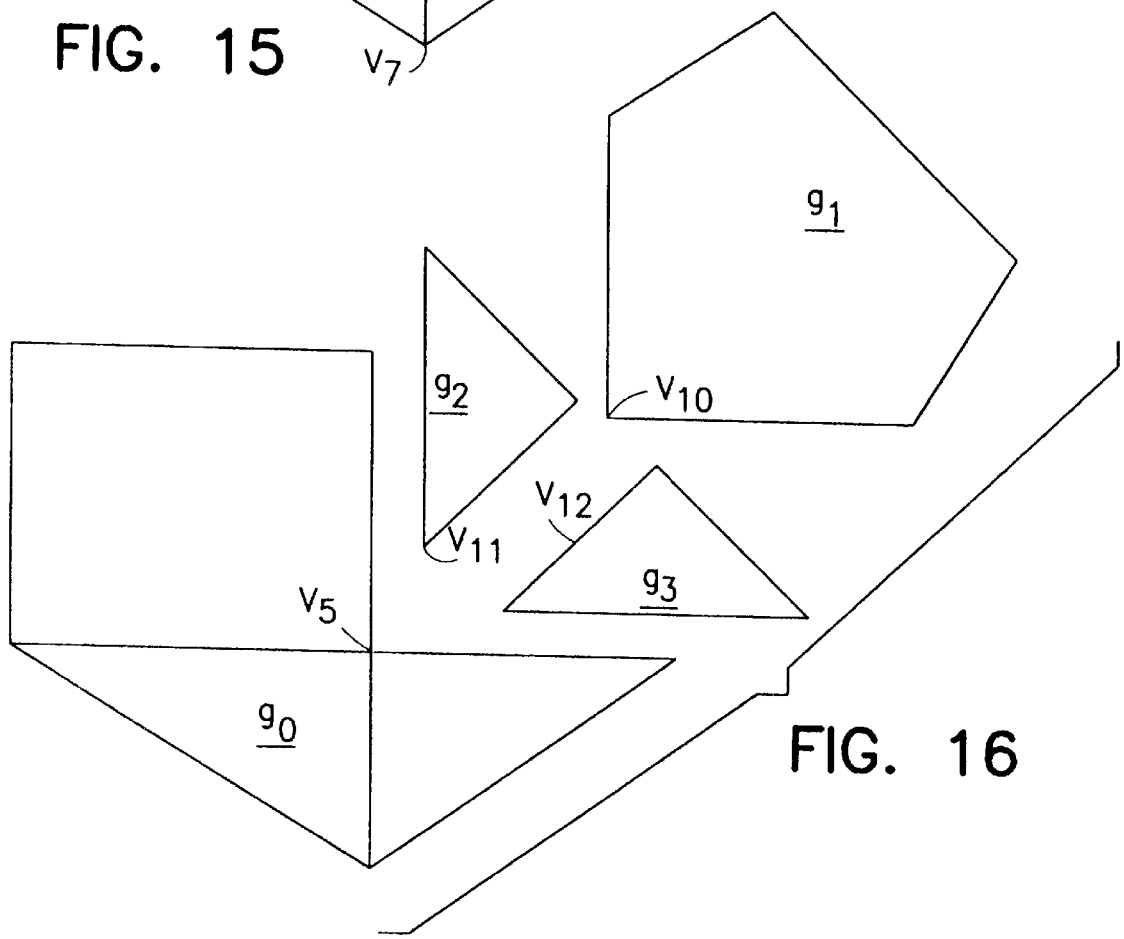
FIG. 16 is a pictorial representation of the star of a marked vertex after executing Steps 140 to 170 of FIG. 11.

Since f0 and f2 share the edge (v5,v4) they belong to the same group g0. Since f2 and f3 share (v5,v7), f0, f2 and f3 belong to the same group g0. The remaining faces are partitioned as follows: f1 belongs to its own group noted g1, f4 belongs to its own group noted g2, and f5 belongs to its own group noted g3. This process has created a total of four groups (g0–g3). Such groups of faces are represented in FIG. 16.

For each face the method maintains a representative of the group to which the face belongs. Preferably, an array of group representatives 44 is created. Continuing the example of FIGS. 15 and 16, the size of the array 44 is the valence of vertex V5. Initially, the group representative of each face is the face ID. Preferably each face in the star of a vertex v is indexed by an ID which is an integer number between 0 and valence(v)−1. Subsequently, if it is determined that faces f and g should be joined because they share a non-marked edge, the representatives of f and g are queried in the array 44. This is performed as follows. First note that r(f) is the representative of f. The method sets x=r(f). It is possible that r(f) has a representative r(r(f)) different from r(f), in which case the method sets x=r(x). The method continues by replacing x by its representative until x and r(x) are the same. When the final value of x has been determined, replace the representative of f, r(f), by x in the array of group representatives 44, and replace the representative of the representative of f, r(r(f)), by x, and so on. This operation is generally referred to as path compression, and is explained in detail by R. Tarjan in "Data Structures and Network Algorithms", SIAM, 1983.

Using the same operation, the method obtains the representative y of g. If x and y are the same, f and g are determined to belong to the same group, and no operation is required. Otherwise it can be assumed, without loss of generality, that x is less than y. In this case the method sets the representative of y in the group representative array 44, r(y), to be x.

Returning again to FIG. 11, the result of the decision at Step 150 is 'yes', since more than one group or component has been created. In this case Step 160 and Step 170 are then performed. If a single group had been created at Step 140, the method would instead directly execute Step 180, as the decision at Step 150 would be 'no'.

In Step 160, the vertex v5 is multiplied by creating three additional copies of v5, denoted v10, v11 and v12. In the general case, if nG denotes the number of groups that were created, the method creates nG−1 additional vertices. In the exemplary case of FIG. 15, the method creates three additional vertices: v10, v11 and v12.

In Step 170 the occurrence of v5 in the face list is replaced by an occurrence of v10, v11 or v12 using the following rule:

if a given face belongs to the group g0, then v5 is not replaced; or else if the face belongs to the group g1, then v5 is replaced with v10; or else if the face belongs to the group g2, then v5 is replaced with v11; and otherwise the face belongs to the group g3, and v5 is replaced with v12.

In the general case, the method creates nG−1 vertices w1, w2, . . . , if a face belongs to the group g0, then the vertex is not replaced;

if a face belongs to the group g1, then the vertex is replaced with w1;

if a face belongs to the group g2, then the vertex is replaced with w2, and so on.

Accordingly, the new face list for the star of v5 is as follows:

f0: v0, v4, v5, v1
f1: v1, v10, v6, v3, v2
f2: v4, v7, v5
f3: v5, v7, v6
f4: v1, v11, v9
f5: v12, v6, v8

Also in Step 170, the method builds the vertex look up table (VLUT) 45 corresponding to the vertices that were newly created, i.e., v10, v11 and v12. A VLUT 45 corresponding to the case of FIG. 15 is illustrated in FIG. 4C.

In Step 180, the method examines the list of marked vertices and determines whether the list is empty. In the list is not empty, control returns to Step 130. Otherwise, the local cutting process is terminated.

GLOBAL CUTTING METHOD

Figure 12:
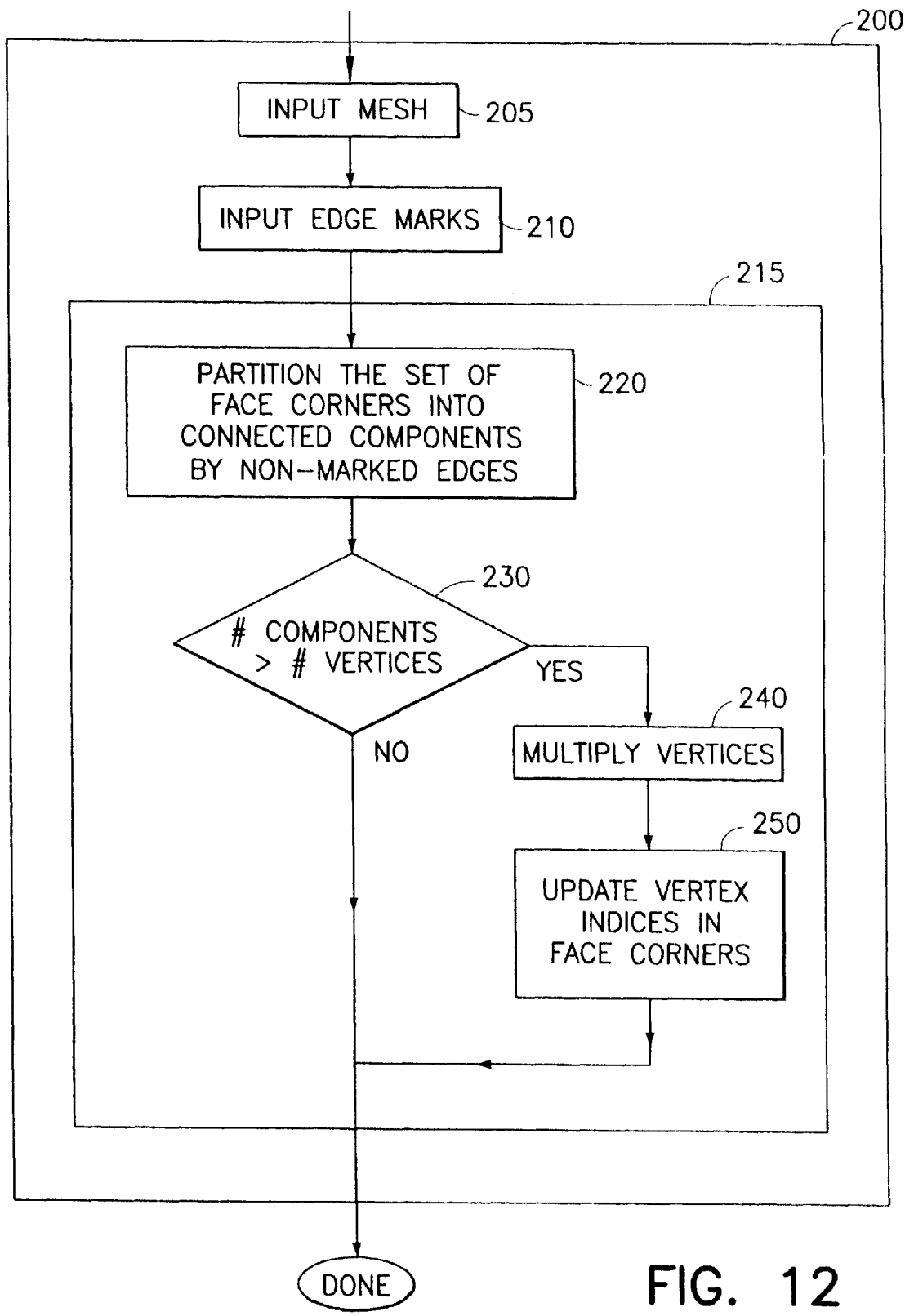
FIG. 12 is a flow chart illustrating a global method for cutting a mesh through a set of edges.

Referring to FIG. 12, in Step 200 the method executes a global method for cutting a mesh through a set of marked edges. As employed herein a global method for cutting a mesh is considered to be a method that operates on every vertex of the set V and on every face of the set P.

In Step 205, the mesh is imported or inputted to the computer memory 64, 71, as in Step 105 of FIG. 11. In Step 210 the edge marks are inputted to the array of edge marks 40 in the computer memory, as in Step 110 of FIG. 11.

In Step 215, the method cuts the mesh through the marked edges as indicated by the marked edge array 40. Step 215 includes a number of sub-steps that are numbered from 220 through 250.

More particularly, in Step 220 the method builds a set of face corners 46. The set of face corners 46 is built by cutting through all the edges at once and by considering each face to be disconnected from the other faces. For each vertex listed in the face list 20, a corner w with a unique index is created. The number of corners equals the length of the face list 20.

Figure 17:
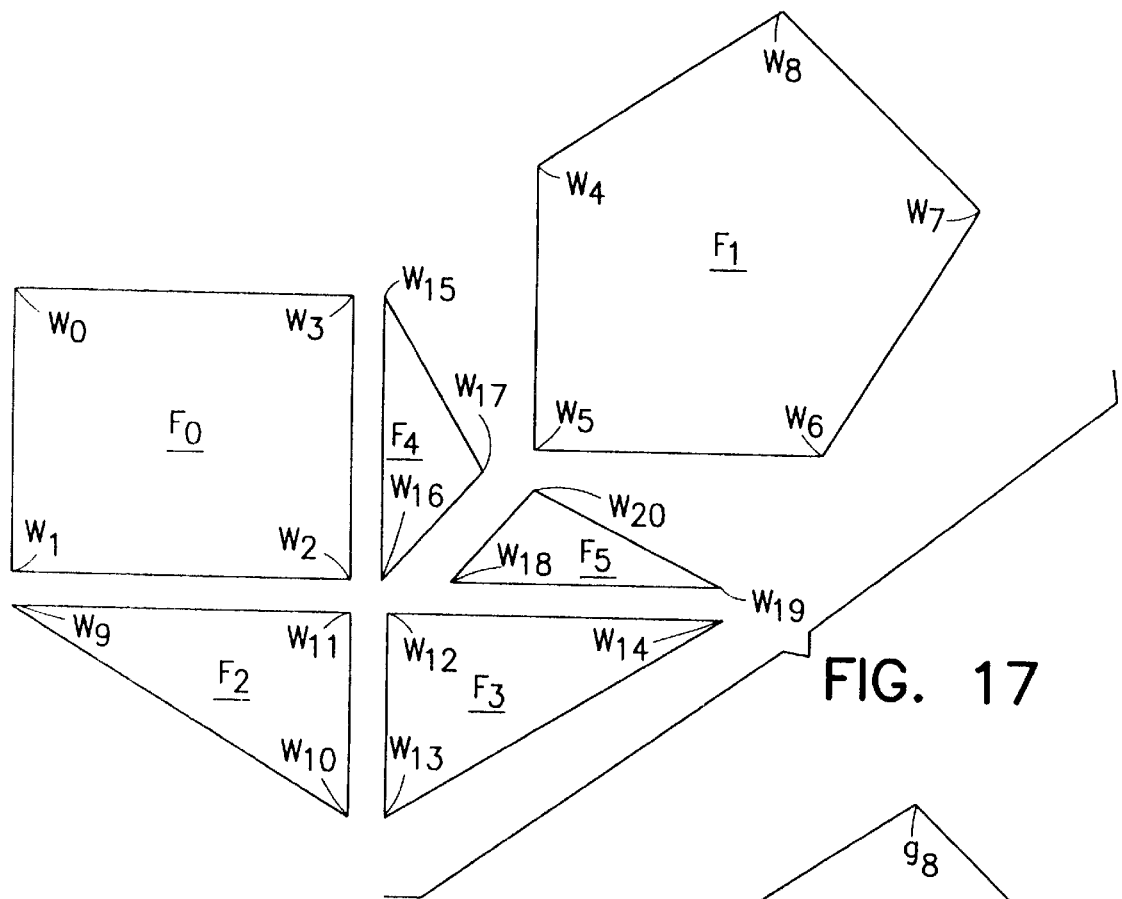
FIG. 17 is a pictorial representation of the corners in the star of a vertex.

For explanatory purposes, consider the configuration shown in FIG. 15. The process of determining the face corners w is shown in FIG. 17 for an exemplary case of a surface with six faces.

The method first obtains the following face corner list 46 for the faces f0, f1, f2, f3, f4 and f5:

f0: w0, w1, w2, w3
f1: w4, w5, w6, w7, w8
f2: w9, w10, w11
f3: w12, w13, w14
f4: w15, w16, w17
f5: w18, w19, w20

Then, in Step 220, the set of corners is partitioned into components connected with non-marked edges. Assume for this example that the marked edges of the configuration of FIG. 15 are (v2, v5) and (v5, v6). When considering the non-marked edge (v5,v4), it is decided that w1 and w9 are in the same group, and that w2 and w11 are in the same group. When considering the edge (v5,v7), it is decided that w11 and w12 are in the same group, and that w10 and w13 are in the same group.

The partitioning occurs when visiting every non-marked edge, not just the edges incident on v5. The resulting groups of corners 47 are numbered with a unique corner group index.

Similarly to Step 150, to perform Step 220 the method preferably uses a corner group representative table 44, whose size equals the total number of corners. Initially, the corner group representative of a given corner is the corner ID. As corners are grouped, the representative table 44 is updated as indicated in Step 150 and in the above-referenced Tarjan publication "Graph and Network Algorithms".

Then, in Step 230, it is determined whether the number of corner groups 47 is larger than the original number of vertices. If this is not the case, the cut has been performed and the procedure is terminated.

Figure 18:
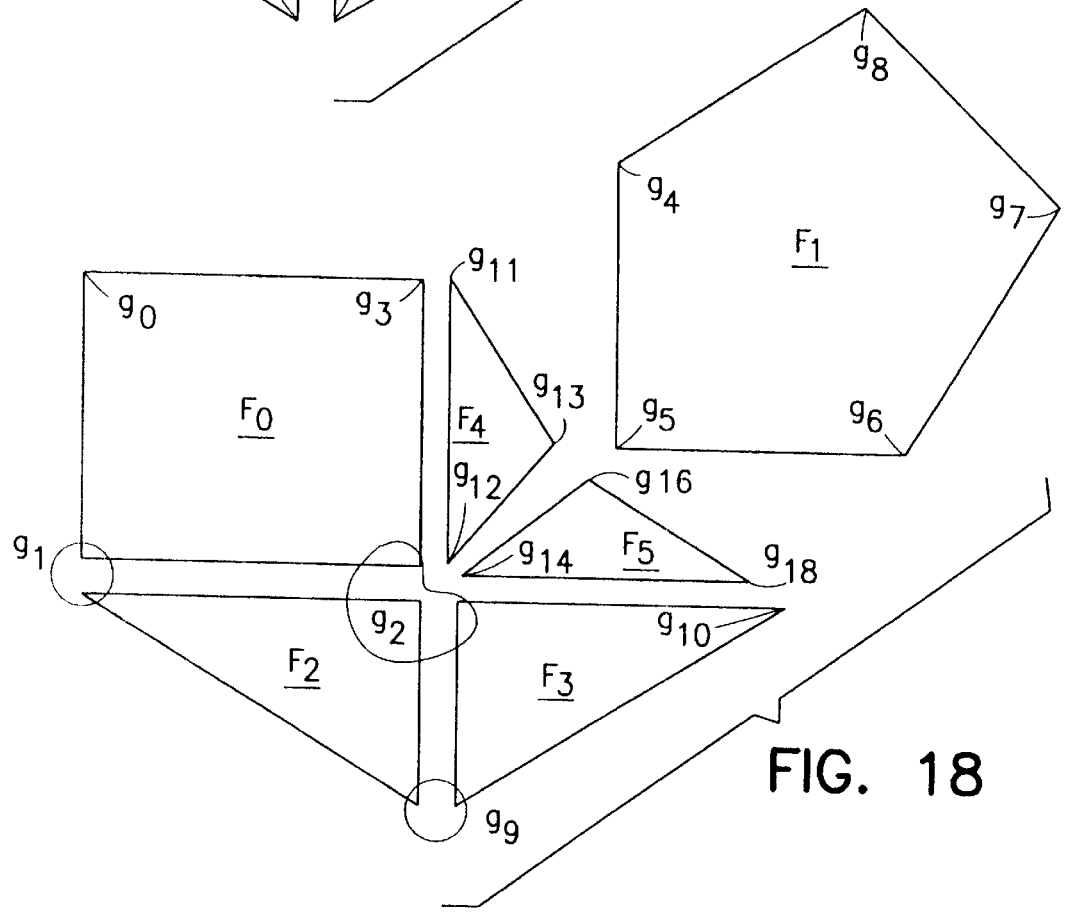
FIG. 18 is a pictorial representation of the corners in the star of a vertex after executing a corner grouping operation of Step 240 of FIG. 12.

Otherwise, Step 240 is executed by the performing the following sub-steps. In the face corner list 46, each corner is replaced with the corresponding corner group number. The corner groups are numbered by looping through the corners and by assigning a new consecutive number to each corner that is its own representative. For example, the result of processing the configuration of FIG. 17 is shown in FIG. 18. Accordingly, the resulting face list for the cut mesh is:

f0: g0, g1, g2, g3
f1: g4, g5, g6, g7, g8
f2: g1, g9, g2 f3: g2, g9, g10
f4: g11, g12, g13
f5: g14, g15, g16

Then, a new vertex list 10 is created by performing the following sub-steps. The method first loops through the face corner list 46, and for each corner group 47 that is its own representative a vertex entry is created in the new vertex list 10 by copying the coordinates of the vertex corresponding to that group in the previous face list 20. There is a one to one correspondence between each element of the face list and an element of the face corner list.

Also in Step 240, a new vertex look-up table (VLUT) 45 is computed that gives the correspondence between the new vertices, that are corner groups, g0 ... g16, and the previous vertices v0 ... v9. An example of this procedure is illustrated in FIG. 4D.

A previous VLUT may have been created during the first pre-processing step of removing unreferenced vertices. To create the new look-up table, the method loops through the face corner list 46, and for each corner group 47 that appears for the first time, the method creates an entry in the new VLUT, by copying the previous VLUT entry of the vertex corresponding to that group in the previous face list 20.

For explanatory purposes, assume that the faces are triangles. In this case "vertices" refer to the vertex list 10, "new_vertices" the new vertex list, "triangles" the face list 20, and "corners" the face corner list 46. Also in this case "new_vlut" refers to the new vertex look-up table 45, "old_vlut" refers to the old vertex look-up table, "representative" refers to the corner group representation table, nT is the number of triangles, and new_nV the new number of vertices after cutting.

Exemplary C-programming language code for implementing Step 240, is as follows. Replacing corners with corner group numbers:

```
for (new_nV = i = 0; i < 3 * nT; i=i+1)
{
    corner_rep = representative[i];
    if (corner_rep == i)
    {
        corner[i] = new_nV;
        new_nV = new_nV+1;
    }
    else corners[i] = corners [corner_rep];
}
```

Building a new vertex list and a new vertex look-up table:

```
for (i = 0; i < 3 * nT; i=i+1) if (i == representative[i])
{
    new_vlut[corners[i]] = old_vlut[triangles[i]];
    new_vertices[corners[i]] = vertices[triangles[i]];
}
```

Step 250 identifies the face list 20 with the face corner list 46. Once this last operation is completed, the global cutting method has been performed and the procedure is terminated.

METHODS FOR CONVERTING A NON-MANIFOLD MESH TO A MANIFOLD MESH

Figure 13A:
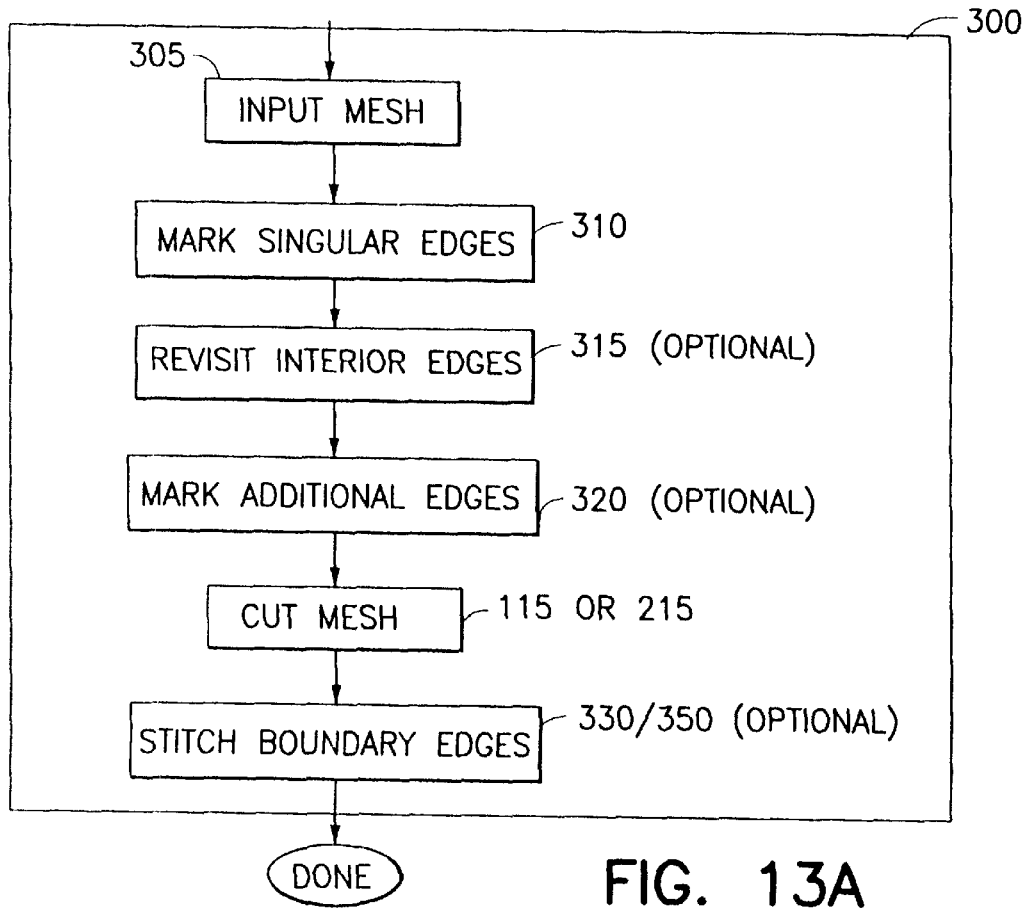
FIG. 13A is a flow chart illustrating a method for converting a non-manifold mesh to a manifold mesh.

Referring to FIG. 13A, in Step 300 the method converts a non-manifold surface to a manifold surface, either oriented or not oriented. Step 300 includes sub-steps 305–330 (Steps 320 and 330 are optional).

In Step 305, the mesh is imported or inputted to the computer memory 64, 71, as in Step 105 of FIG. 11.

In Step 310, the method determines the set of singular edges, and marks such singular edges. Singular edges are determined by looping through the face list 20, and by building a list of edges and incident faces as the faces are encountered. Initially, the edge list is empty.

For example, when visiting the face f0: v0, v4, v5, v1, the method creates the following edge entries:

e0: v0, v4: f0
e1: v4, v5: f0
e2: v1, v5: f0
e3: v0, v1: f0

When subsequently the same edge (meaning the same consecutive vertex pair, wherein the order in the pair is not significant) is encountered in another face, the edge record is updated. If a new edge is encountered, an entry is added in the edge list. For example, when visiting the face f1, the edge (v1,v5) is first encountered and accordingly, the edge entries are modified as follows:

e0: v0, v4: f0
e1: v4, v5: f0
e2: v1, v5: f0, f1
e3: v0, v1: f0

The edge (v5,v6) is then encountered and a new entry is added in the edge list:

e4: v5, v5: f1

Once all the faces have been processed, the edges are classified as follows:

(a) edges with one incident face are called boundary edges;
(b) edges with two incident faces are called interior edges;
(c) edges with three or more incident faces are called singular edges. A label is assigned to each edge to indicate its category.

Optionally, in Step 315, the method may revisit edges labeled interior edges in the list of edges. For a given interior edge, if the two faces sharing that edge have incompatible orientations (meaning that the pair of vertices defining the edge appears in the same consecutive order, modulo circular permutation, in each face vertex cycle), or if the two faces share three or more consecutive vertices, the edge is relabeled as singular. This optional Step 315 results in producing an oriented manifold surface after cutting along singular edges. The difference as compared to the forthcoming Step 320 is that more singular edges are identified in Step 315 that are in Step 320, resulting in a larger number of components after cutting.

Figure 13B:
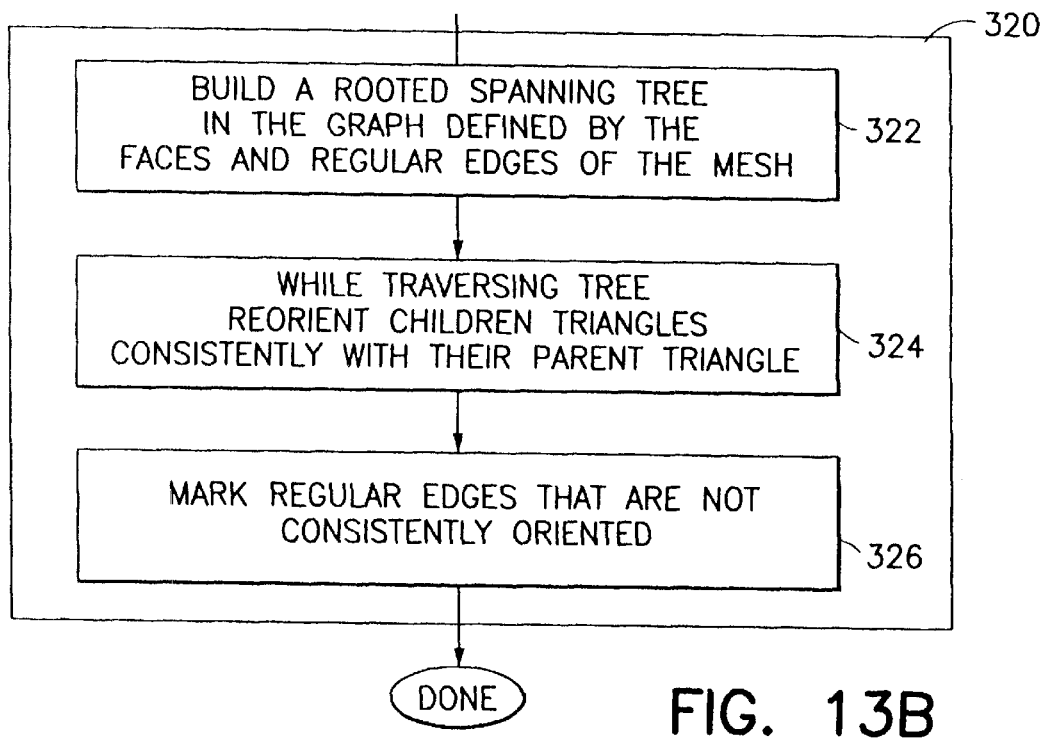
FIG. 13B is a flow chart illustrating a method for converting a non-manifold or manifold mesh to an oriented manifold mesh.

In the optional Step 320, the method potentially marks additional edges for the purpose of obtaining an oriented manifold mesh. Step 320 comprises the sub-steps numbered from 322 to 326, as shown in FIG. 13B.

In Step 322, the method builds a rooted spanning tree in the graph whose vertices are the mesh faces and whose edges are the non-marked regular edges. It is readily understood that those skilled in computer algorithms are familiar with the aforementioned terminology. In addition, spanning trees are discussed by R. Tarjan in "Data Structures and Network Algorithms", SIAM, 1983.

In Step 324, the method traverses the spanning tree starting from the root and re-orients child faces consistently with their parent face. Re-orienting a face is performed by inverting the vertex cycle order for the face in the face list 20.

In Step 326, the method serially visits all non-marked regular edges and marks such edges that are not consistently oriented after the re-orientation of Step 324.

The method then executes the above-described Steps 115 or 215 (cut mesh) and, as an option, one can elect to perform Step 330 (stitch boundary edges), or Step 350 (stitch boundary edges within the same boundary).

The method for converting non-manifolds to manifolds omits Step 320. The method for converting non-manifolds to oriented manifolds uses Step 320.

METHOD FOR STITCHING BOUNDARY EDGES OF THE CUT MESH

In Step 330 of FIG. 13A the method stitches or joins the cut mesh through boundary edges. Step 330 comprises the sub-steps numbered from 331 to 345 inclusively, as illustrated in the flow chart of FIG. 14A.

In Step 331, a set A of stitched edge pairs is created and is initialized as an empty set. In Step 331A, the method identifies the set of boundary edges B1 of the cut mesh.

Also in Step 331A, the method constructs the set B2 of boundary vertices as follows. Initially the set B2 is empty. The method loops through the edges of the set B1 and adds to B2 both end points of each edge, only if they are not already in B2.

Also in Step 331A, the method creates and initializes an array R of representatives of boundary vertices. Initially each boundary vertex is its own representative. The use of representatives was described above, for example in Step 240. In all forthcoming Steps 332 to 345, when a reference is made to a particular boundary vertex v, what is implied is the representative of the boundary vertex v.

In Step 332, the method determines a set B of marked edges of the input mesh that satisfy the following property: each edge of B must correspond to two or more edges of the set B1. Whether a marked edge corresponds to two or more edges of the set B1 is preferably determined as follows.

The method employs the vertex look up table 45 that was obtained after cutting (Step 115 or Step 215) and that, for each new vertex, provides the ID of the original vertex of which it is a copy (see, for example, FIG. 4C).

For a given edge e, the method examines the two entries in the vertex look up table 45 (VLUT) corresponding to the two edge end points; and also examines VLUT entries for end points of edges of B1. If the same pair of entries are retrieved more than once, for example for edges e1, e2, e3 and e4 of B1, the method adds Edge e to the set B, and also adds Edges e1, e2, e3 and e4 to the record corresponding to e in B, as:

e: e1, e2, e3, e4.

In Step 333, a determination is made if the set B is empty. If yes, control passes to Step 334 to perform edge stitching. If no, control passes instead to Step 335.

In Step 334, the method stitches each edge pair in the set A. To stitch the edges f1 and f2, the method considers the end point vertices of f1, v1 and v2, and of f2, v3, and v4 as determined in Step 332. The method identifies the vertex v3 with the vertex v1, and identifies the vertex v4 with the vertex v2. Once all vertex pairs corresponding to each stitched edge have been identified, the face list 20 is modified by replacing each occurrence of v3 with v1, each occurrence of v4 with v2, and so on for each pair of identified vertices. The vertices v3 and v4 are removed from the vertex list 10, vi and v3 have identical VLUT entries, and v2 and v4 have identical VLUT entries. The stitching process is then completed.

In Step 335, a marked edge is selected from the set B, for example Edge e, and in Step 336 a second set of stitched edge pairs D is created and is initialized as an empty set.

In Step 337, a pair of boundary edges are selected corresponding to Edge e, for example, Edges e1 and e2 are selected.

It is noted that the order of the end points is important for this choice: the end points of an edge are listed in the order of appearance when serially visiting the boundary to which they belong. If the VLUT entries corresponding to e1 are v1 and v2, in that order, the end points of e2 must be v2 and v1, in that order. This enables the stitching of edges with consistent boundary orientations. Edge pairs that do not satisfy the consistent boundary orientation property are not selected for stitching in Step 337.

In Step 338, a series of tests are performed to determine whether the edges e1 and e2 are stitchable. These tests are referred to as a "same face" test, an "adjacency" test, and a "common vertex in star" test.

The "same face" test is optional. If the user decides to omit the "same face" test then the method directly performs the "adjacency" test. The "same face" test can be omitted by, for example, the user not selecting a "same face" test option presented to him or her in a menu of method functions.

"Same Face" Test

The boundary faces f1 and f2 are retrieved that are incident to e1 and e2, respectively, and the "same face" test verifies that the vertex VLUT entries corresponding to f1 are different from the entries corresponding to f2. If three or more consecutive (i.e., consecutive modulo circular permutation) vertex VLUT entries are the same, then the stitching of e1 and e2 is forbidden. Performing such a stitch creates adjacencies between polygons that previously shared the same vertices. The user can determine whether this situation should be avoided. For example, in a computer graphics application, when one desires that three dimensional objects have photometric properties (i.e., color, texture, material properties) corresponding to both the inside and outside of the objects, it is common to duplicate each model triangle, orient the duplicate in the opposite direction to the original, and assign new properties to the duplicate triangle; vertices are not duplicated. When processing such a model with the method of this invention, the above-described second preprocessing step would be omitted (i.e., duplicate triangles would not be identified); and Steps 115 or 215 would be performed as indicated. When stitching, the method applies the "same face" test to obtain one inside sheet of connected triangles and one outside sheet of connected triangles. If the "same face" test is passed, the "adjacency" test is performed.

"Adjacency" Test

Figure 6:
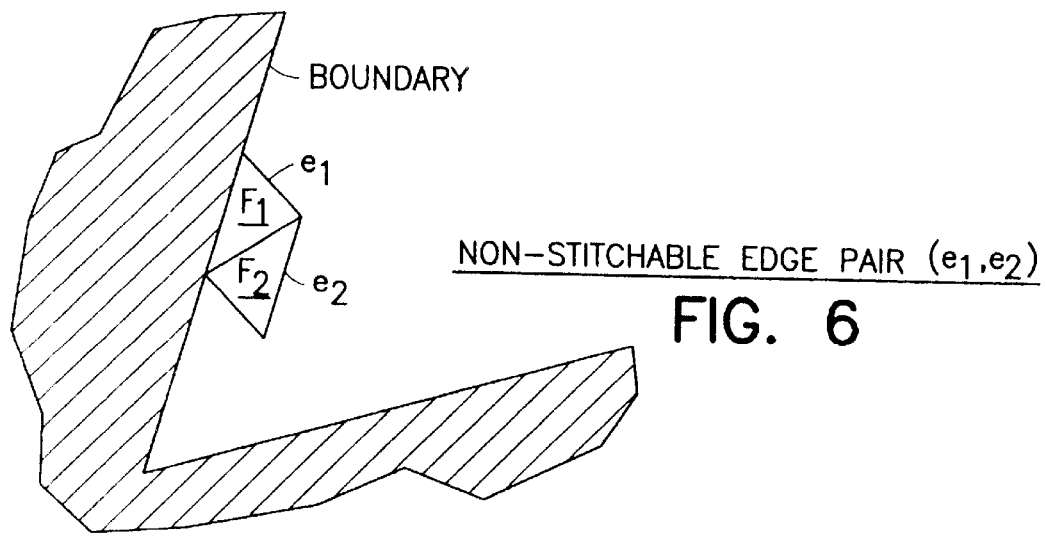
FIG. 6 is a pictorial representation of a non-stitchable edge pair (e1,e2)

As before, the boundary faces f1 and f2 are retrieved that are incident to e1 and e2, respectively, and a determination is made if f1 and f2 are adjacent faces. The faces f1 and f2 are considered to be adjacent if they share two consecutive vertices. If it is determined that f1 and f2 are not adjacent faces, the "same face" test is performed as described below. A situation wherein f1 and f2 are adjacent faces is illustrated in FIG. 6. The "adjacency" test is a particular case of the "common vertex in star" test. It is possible to omit the adjacency test and perform the "common vertex in star" test directly. However, the adjacency test is significantly simpler, and if a potential stitch fails the adjacency test, it is not necessary to perform the "common vertex in star" test.

"Common Vertex in Star" Test

Figure 9:
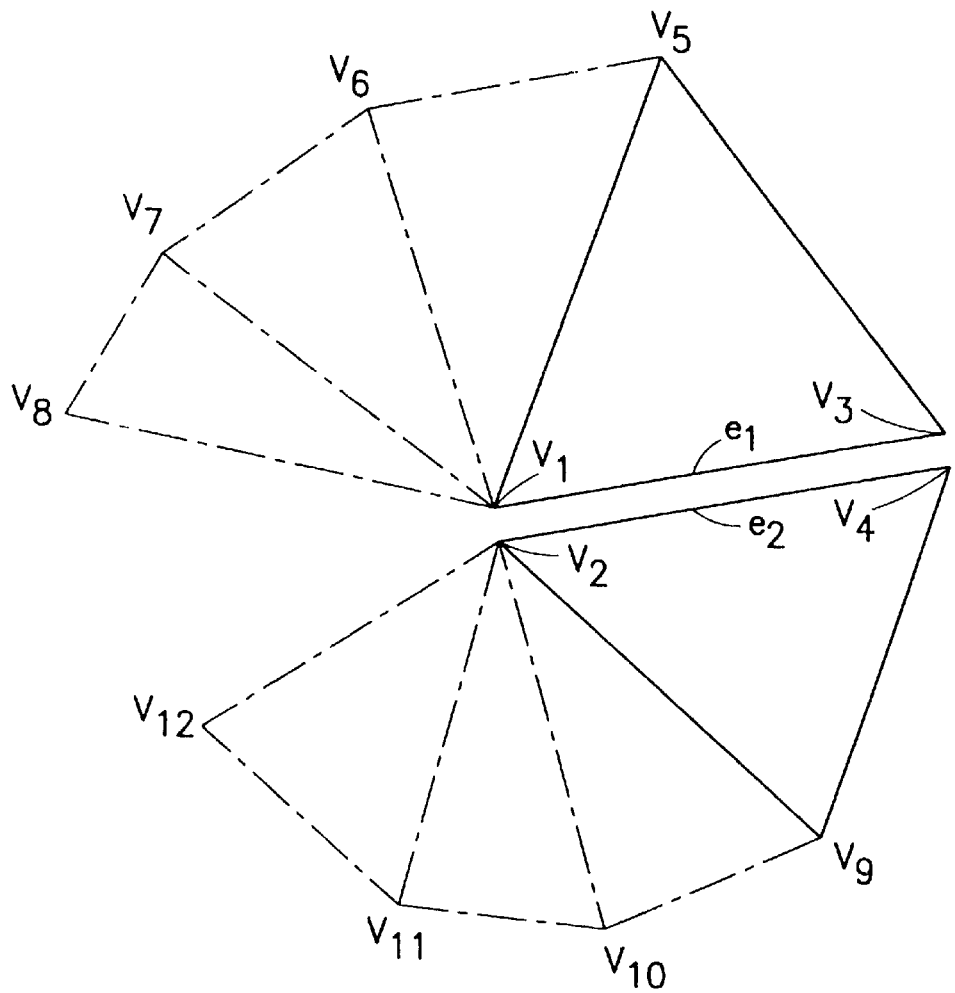
FIG. 9 is an illustration of a Case I of a "common vertex in star" test for determining whether two edges can be stitched.

The "common vertex in star" test includes the following operations. As shown in FIG. 9, note that v1 and v3 are the vertices that are the representatives of the end points of the edge e1, and note that v2 and v4 are the vertices that are the representatives of the end points of the edge e2. A first test is made to determine whether v1 and v2 are stitchable, and then whether v3 and v4 are stitchable. To determine whether v1 and v2 are stitchable two cases are analyzed. In CASE I (FIG. 9), v1 and v2 are different vertices. In this case the method collects all vertices of the star of v1 starting from v3, and omits the first vertex, which is v3, and marks the last vertex. For example, with the configuration of FIG. 9 the following vertices are collected: v5, v6, v7, v8, and the last vertex v8 is marked.

Techniques for collecting vertices in the star of a vertex v are well known in the computer graphics arts. These techniques can be applied to any manifold surface, oriented or non-oriented. For instance, if the faces are triangles, one suitable technique loops through all the triangles containing v1, and adds the three triangle vertices to the list of vertices adjacent to v1. The multiple occurrences of v1 are then removed from the list and the vertices occurring only once in the list are recognized as the first vertex and the last vertex. The remainder of the vertices are then collected.

The vertices of the star of v2 are then collected starting from v4, omitting the first vertex and marking the last vertex. For example, in the configuration of FIG. 9, the method collects the vertices v9, v10, v11, v12, and marks v12.

If none of the collected vertices are the same, it is determined that the vertices v1 and v2 are stitchable. It can also be determined that the vertices v1 and v2 are stitchable if the two marked vertices (in this example v8 and v12) are the only vertices that are the same.

For example, in the configuration of FIG. 9 none of the vertices v5, v6, v7, v8, v9, v10, v11, v12 are the same, so v1 and v2 are determined to be stitchable.

Figure 10:
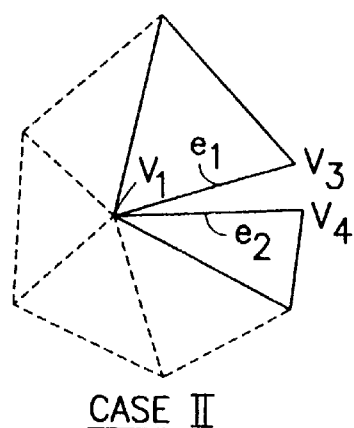
FIG. 10 is an illustration of a Case II of the "common vertex in star" test.

In CASE II (FIG. 10), v1 and v2 are the same vertex. In this case v1 and v2 are determined to be stitchable (either v1 and v2 have already been stitched, or v1 and v2 were one and the same vertex after cutting).

If v1 and v2 are stitchable, then a determination is made as to whether v3 and v4 are stitchable. The test for determining whether v3 and v4 are stitchable is the same as the test for determining whether v1 and v2 are stitchable.

If both v1 and v2, and v3 and v4 are determined to be stitchable, then it is determined that the edge pair (e1, e2) has passed the "common vertex in star" test successfully. Otherwise, it is determined that the edge pair (e1,e2) failed the "common vertex in star" test.

Figure 7:
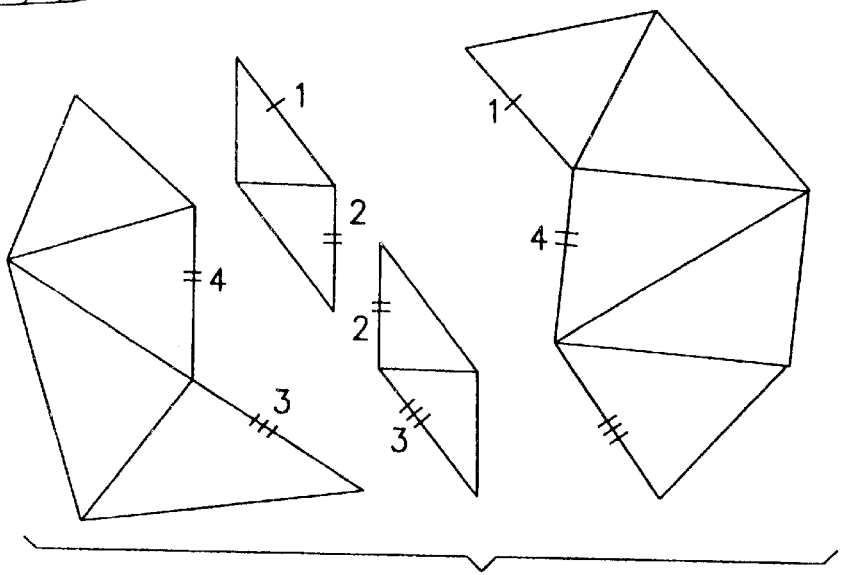
FIG. 7 is a pictorial representation of a configuration of boundary edges that cannot be stitched.
Figure 8:
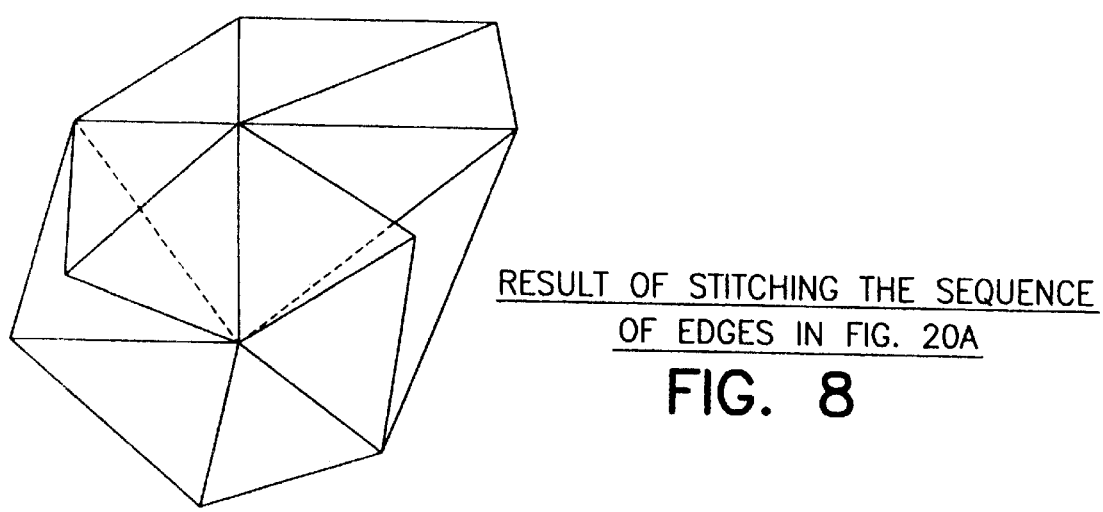
FIG. 8 is a pictorial representation of the configuration that results from the stitching of the boundary edges of FIG. 7 in the sequence specified in FIG. 7.

FIG. 7 and FIG. 8 illustrate the consequences of not performing the "common vertex in star" test, i.e., singular edges and vertices may be generated.

If the "common vertex in star" test is passed, it is determined that Edges e1 and e2 are stitchable, and Edges e1 and e2 are added to the set D of stitched edge pairs.

If Edges e1 and e2 are stitchable, the method next updates the array of boundary vertex representatives R as follows. First, the new representative of v2 is v1, and the new representative of v4 is v3 (supposing without loss of generality that the ID of v2 is larger than the ID of v1, and that the ID of v4 is larger than the ID of v3).

In Step 339, Edges e1 and e2 are removed from the set of boundary edges B1, and Edges e1 and e2 are removed as correspondents to Edge e in set B. If Edge e has one correspondent or less, Edge e is removed from set B.

In Step 340, a set F of pairs of boundary edges of set B1 are determined that are. adjacent to edges in set D. Since D is a connected set of stitched edges, there exists a connected chain E of vertices corresponding to D. In this case refer to w1 as the vertex VLUT entry of the first vertex listed in the chain E, and w2 as the vertex VLUT entry of the last vertex listed in Chain E. An edge pair in F is said to be a forward pair if both edges have vertex VLUT entries corresponding to w1. A backward pair has vertex VLUT entries corresponding to w2. F can either be empty, or contain one forward pair, or contain one backward pair, or both one forward and one backward pair.

In Step 341, it is determined whether the set F is empty. If this is found to be the case, Step 342 is executed, otherwise Step 343 is executed.

In Step 342, the set D is appended to the first set A of stitched edge pairs, and a return is made to Step 333 to test whether B is empty.

In Step 343, a pair (g1,g2) of edges of set F are selected, and in Step 344 a determination is made as to whether g1 and g2 correspond to the same marked edge g in set B. If this is true, Step 338 is performed with edges g1 and g2. Otherwise, Step 345 is performed to remove Edge Pair (g1,g2) from set F.

METHOD FOR STITCHING BOUNDARY EDGES OF THE CUT MESH WITHIN THE SAME BOUNDARY

In an alternative embodiment of the method for stitching through boundary vertices, in Step 350 a method for stitching through the vertices of the same boundary is provided.

Figures 2, 14B:
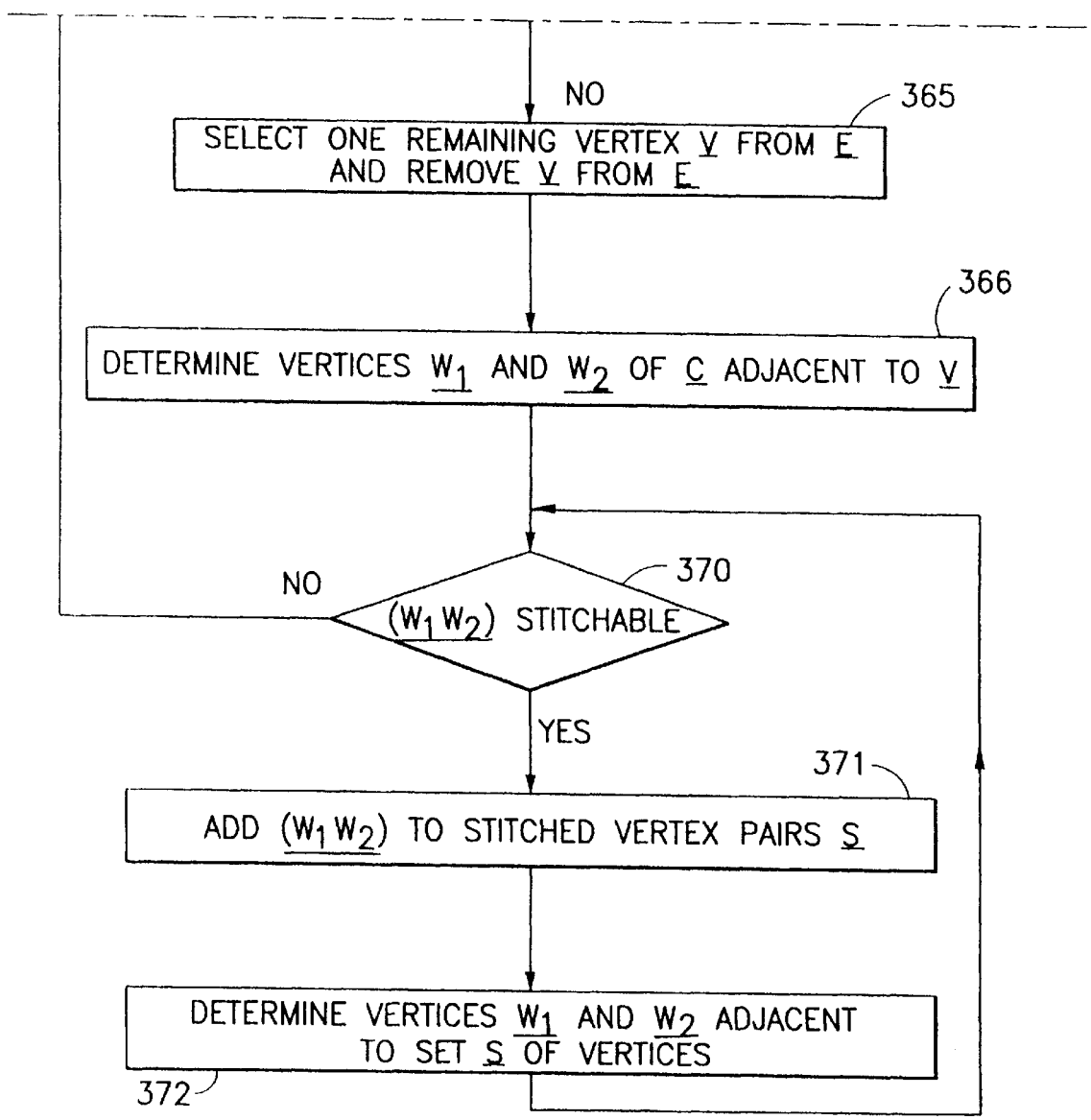
FIG. 14B is a flow chart illustrating a method for stitching through the boundary edges of a manifold surface within the same boundary.

Step 350 comprises the sub-steps numbered 351 through 372 inclusively, and is illustrated in the flow chart of FIG. 14B.

In Step 351, an empty set S of stitched vertex pairs is created, as is an array R of representatives. In Step 352 a set B of mesh boundaries is determined. Preferably the set B is determined by identifying boundary edges and by organizing the identified boundary edges in connected components. Algorithms for determining connected components are discussed by R. Tarjan in "Data Structures and Network Algorithms", SIAM, 1983. It is assumed that those skilled in the art are familiar with connected components algorithms.

In Step 353, a determination is made as to whether the set B is empty. If this is found to be the case, then control passes to Step 355 to stitch the vertices of S, and the stitching process is completed. Otherwise, the method selects in Step 356 one particular boundary C ("curve") from the set B, and removes C from B.

In Step 355 the method stitches the vertex pairs of S. Let n denote the number of vertex pairs in set S. For each pair of vertices (w1, w2) of S, each vertex is replaced with its representative queried from Array R. After all vertex pairs have been processed, the method removes from the list of vertices 10 all of the boundary vertices that are not their own representatives: n vertices are removed. The remaining vertices are renumbered and the previous vertex IDs are replaced with the new vertex IDs in the face list 20, as explained above with regard to the third optional preprocessing step. This completes the stitching process.

For the case where the set B is found not to be empty at Step 353, and after executing Step 356 as explained above, Step 358 is executed.

In Step 358, a set E ("eyes" of the stitch) of vertices of C are determined such that adjacent vertices to a vertex of E have identical vertex VLUT 45 entries. In Step 360, a determination is made as to whether the set E is empty. If this is the case then the test of Step 353 is performed and, if it is determined that the set B is empty, Step 355 is executed to stitch the vertices of S, as described above. Otherwise, Step 365 is performed.

In Step 365, the method selects a vertex v in the set E and removes v from E. In Step 366, a determination is made of the vertices w1 and w2 of C that are adjacent to v. In Step 370, w1 and w2 are examined to determine if they are stitchable using the criterion that w1 and w2 are potentially stitchable if they have the same vertex VLUT 45 entry. In addition, potentially stitchable vertices w1 and w2 must satisfy the following criterion, which is a particular case of the adjacency test. First note e1 and e2, the boundary edges that are identified when stitching w1 and w2, and note f1 and f2, the boundary faces supporting respectively e1 and e2. The boundary faces f1 and f2 should not be adjacent faces. This test is illustrated in FIG. 6.

Also, w1 and w2 must be stitchable according to the "common vertex in star" test of Step 338. If this last condition is satisfied potentially stitchable vertices w1 and w2 are determined to be stitchable. optionally, the "same face" test can be applied to f1 and f2.

It should be noted that the "same face" test does not apply for triangles, as two triangles sharing three vertices would be belong to different boundaries after cutting.

If it is determined that w1 and w2 are stitchable, the method updates the array of boundary vertex representatives R to reflect that the new representative of w2 will be w1 (assuming without loss of generality that the ID of w2 is larger than the ID of w1.

The method also adds the pair (w1,w2) to the set S of stitched edge pairs in Step 371, determines new vertices w1 and w2 adjacent to S in Step 372, and returns to Step 370. Otherwise, a return is made to Step 360.

It should be realized that this invention can be practiced using one or more of the methods disclosed in detail above, and it is not required that all of the methods be used for a given application. By example, the conversion of a non-manifold surface to a manifold surface, possibly an oriented manifold surface, can be accomplished using either the local or the global cutting methods, and stitching of the surface is optional. Also, one of the cutting methods can be used alone as when, by example, it is desired to transmit a surface definition through a network in parts. In this case the surface can be partitioned by cutting one or more times, using either the local or global cutting method, and then each of the partitions separately transmitted through the network.

It should further be realized that some of the disclosed method steps could be executed in other than the order shown, and the modified method(s) will still fall within the scope of the teaching of this invention.

Thus, while the invention has been particularly shown and described with respect to preferred embodiments thereof, it will be understood by those skilled in the art that changes in form and details may be made therein without departing from the scope and spirit of the invention.

What is claimed is:

1. A computer implemented method for converting a non-manifold surface to a manifold surface, comprising steps of:
   providing data in a memory of a computer for representing a non-manifold polyhedral surface comprised of a plurality of polygons each bounded by edges and having vertices, the non-manifold polyhedral surface comprising singular vertices and edges;
   analyzing the data that represents the non-manifold polyhedral surface to determine and mark the presence of the singular edges and singular vertices; and
   cutting through all of the singular edges and singular vertices of the non-manifold polyhedral surface to provide a plurality of connected polyhedral surfaces that are free of singularities.

2. A method as in claim 1, wherein the step of analyzing includes the initial steps of analyzing the data to remove isolated vertices, repeated polygons, and polygons that are incident to invalid vertices.

3. A method as in claim 2, wherein the step of removing isolated vertices includes the steps of:
   determining a vertex valence by counting a number of triangles incident to each vertex;
   identifying an isolated vertex as one having zero valence; and
   assigning new indices to non-isolated vertices.

4. A method as in claim 2, wherein the step of removing isolated polygons includes the steps of:
   sorting the vertices within each polygon;
   sorting the polygons; and
   identifying and removing those polygons that are repeated.

5. A method as in claim 2, wherein the step of removing polygons that are incident to invalid vertices includes the steps of:
   looping through a polygon face list;
   determining if a particular polygon is incident to an invalid vertex; and
   removing those polygons that are determined to be incident to an invalid vertex.

6. A method as in claim 1, wherein the step of cutting also cuts through other edges that are specified for cutting.

7. A method as in claim 1, wherein the step of analyzing the data to determine and mark the presence of singular edges includes the steps of:
   counting a number of polygons incident to each edge; and
   identifying as a singular edge any edge having three or more incident polygons.

8. A method as in claim 7, and further comprising the step of:
   identifying as a boundary edge any edge having only one incident polygon.

9. A method as in claim 1, wherein the step of analyzing the data to determine and mark the presence of singular vertices includes the steps of:
   identifying as a singular vertex any vertex that is an end point of a singular edge; and
   identifying as a singular vertex any vertex having a polygon star that has more than one connected component.

10. A method as in claim 1, and further comprising a step of orienting a particular one of the polygonal surfaces by reversing its constituent polygons.

11. A method as in claim 1, wherein the step of cutting operates in accordance with a local cutting method.

12. A method as in claim 11, wherein the local cutting method includes steps of:
   establishing a set of marked edges, comprising singular edges and other edges; and
   cutting through the marked edges by the steps of, determining a set of marked vertices from the set of marked edges and by marking all vertices whose vertex star includes more than one component;
   determining a set of faces incident to each marked vertex;
   partitioning the set of faces into one or more groups connected by non-marked edges, while maintaining for each of the faces of the set a representative group to which the face belongs;
   for a case wherein more than one group has been established, multiplying vertices to obtain nG−1 additional vertices, where nG indicates a number of groups that were established; and selectively replacing a multiplied vertex by one of the additional multiplied vertices.

13. A method as in claim 12, wherein the step of selectively replacing a multiplied vertex is performed in accordance with the following criteria, wherein the method creates nG−1 vertices w1, w2, . . . , if a face belongs to a group g0, then the vertex is not replaced;

if a face belongs to a group g1, then the vertex is replaced with w1;

if a face belongs to a group g2, then the vertex is replaced with w2, and so on.

14. A method as in claim 1, wherein the step of cutting operates in accordance with a global cutting method.

15. A method as in claim 14, wherein the global cutting method includes steps of:

establishing a set of marked edges, comprising singular edges and other edges; and cutting through the marked edges by the steps of, building a set of face corners by cutting through all edges, considering each face to be disconnected from other faces, and for each vertex creating a corner;

partitioning the set of face corners into one or more corner groups connected by non-marked edges;

determining if the number of corner groups is larger than the original number of vertices;

if the number of corner groups is not larger than the number of vertices, then the global cutting method is terminated; else replacing each corner with a corresponding corner group number;

creating a list of new vertices from the face corners;

creating a new look-up table to establish correspondence between the new vertices that are corner groups and previous vertices; and identifying a face list with the set of face corners.

16. A method as in claim 1, and further comprising a step of stitching the cut surface along boundary edges.

17. A method as in claim 16, wherein the step of stitching includes a preliminary step of testing edges to determine if they are stitchable.

18. A method as in claim 16, wherein the step of stitching occurs through one of boundary edges or vertices of the same boundary.

19. A method as in claim 16, wherein the step of stitching occurs through boundary edges and comprises the steps of:

creating a first set A of stitched edge pairs;

identifying a set of boundary edges B1 of the cut surface;

constructing a set of boundary vertices B2;

creating an array R of representative boundary vertices;

determining a set B of marked edges that satisfy the condition that each edge of B corresponds to two or more edges of the set of boundary edges B1;

determining if the set B is empty, and if it is not, selecting a marked edge from set B and creating a second set of stitched edge pairs D;

selecting a pair of boundary edges that correspond to the selected marked edge and that exhibit a consistent boundary orientation property;

performing one or more tests to determine if the pair of selected boundary edges are stitchable and, if they are determined to be stitchable, performing the steps of, adding the pair of selected boundary edges to the second set of stitched edge pairs D, updating the array R, removing the pair of selected boundary edges from the sets B1 and B;

determining a set F of pairs of boundary edges that are adjacent to edges in set D; and determining if the set F is empty and, if it is, appending the second set of stitched edge pairs D to the first set A, and testing to determine if set B is empty, else, if the set F is determined not to be empty, selecting a pair of edges of set F and determining if the selected pair of edges correspond to the same marked edge in set B, if they do correspond, performing the step of testing with the selected pair of edges from set F, else removing the pair of selected edges from the set F;

wherein, when the set B is determined to be empty, the method performs a step of, stitching each edge pair in the set A by replacing vertices associated with one edge by vertices associated with the other edge.

20. A method as in claim 19, wherein the step of performing one or more tests performs at least one of a same face test, an adjacency test, or a common vertex in star test.

21. A method as in claim 16, wherein the step of stitching occurs through boundary vertices and comprises the steps of:

creating a set S of stitched vertex pairs and an array R of representative boundary vertices;

determining a set B of surface boundaries;

determining if the set B is empty, and if it is, stitching the vertices of S, else selecting and removing a boundary C from the set B;

determining a set E of vertices of C;

determining if the set E is empty, and if it is, determining if the set B is empty, and if it is, stitching the vertices of S, else if the set E is not empty, selecting and removing a vertex v from set E;

determining vertices of C that are adjacent to v and determining if the vertices of C are stitchable;

if they are stitchable, updating the array of boundary vertices R and adding the vertices of C to the set S.

22. A method as in claim 1, wherein the polygons are triangles.

23. A computer implemented method for converting a non-manifold surface to a manifold surface, comprising steps of:

providing data in a memory of a computer for representing a non-manifold polyhedral surface comprised of a plurality of polygons each bounded by edges and having vertices and a face, the non-manifold polyhedral surface comprising singular vertices and edges;

analyzing the data that represents the non-manifold polyhedral surface to determine and mark the presence of the singular edges;

classifying edges of all faces as being one of a boundary edge, an interior edge, or a singular edge; and cutting along the singular edges of the non-manifold polyhedral surface.

24. A method as in claim 23, wherein the step of classifying includes a step of:

examining all edges classified as interior edges and, if two faces sharing an interior edge have incompatible orientations, or if the two faces share three or more consecutive vertices, reclassifying the interior edge as a singular edge.

25. A computer implemented method for converting a non-manifold surface to an oriented manifold surface, comprising steps of:

providing data in a memory of a computer for representing a non-manifold polyhedral surface comprised of a plurality of polygons each bounded by edges and having vertices and a face, the non-manifold polyhedral surface comprising singular vertices and edges;

analyzing the data that represents the non-manifold polyhedral surface to determine and mark the presence of the singular edges;

classifying edges of all faces as being one of a boundary edge, an interior edge, or a singular edge;

building a rooted spanning tree whose vertices are faces and whose edges are non-marked edges;

traversing the spanning tree and re-orienting child faces consistently with their parent face;

marking all non-marked edges that are not consistently oriented; and cutting along the singular edges of the non-manifold polyhedral surface.

26. A method as in claim 25, wherein the step of classifying includes a step of:

examining all edges classified as interior edges and, if two faces sharing an interior edge have incompatible orientations, or if the two faces share three or more consecutive vertices, reclassifying the interior edge as a singular edge.

27. A graphics processing system, comprising:

a memory storing data for representing a non-manifold polyhedral surface comprised of a plurality of polygons each bounded by edges and having vertices, the non-manifold polyhedral surface comprising singular vertices and edges; and a data processor coupled to the memory for analyzing the data that represents the non-manifold polyhedral surface to determine and mark the presence of the singular edges and singular vertices, said data processor further operating to cut through all of the singular edges and singular vertices of the non-manifold polyhedral surface to provide a plurality of connected polyhedral surfaces that are free of singularities, thereby converting a non-manifold surface to a manifold surface.

28. A graphics processing system as in claim 27, wherein said data processor operates to cut through all of the singular edges and singular vertices with one of a local cutting method or a global cutting method.

29. A graphics processing system as in claim 27, wherein said data processor further operates to test boundaries to determine if they are joinable and to join together boundaries through one of boundary edges or vertices of the same boundary.

30. A computer program embodied on a computer-readable medium for providing a graphics processing program, comprising:

a graphics data analysis code segment for analyzing data stored in a memory readable by the computer, the stored data representing a non-manifold polyhedral surface comprised of a plurality of polygons bounded by edges and having vertices, the non-manifold polyhedral surface comprising singular vertices and edges, said graphics data analysis code segment operating to determine and mark a presence of the singular edges and singular vertices in the stored data that represents the non-manifold polyhedral surface; and a cutting code segment for cutting through marked singular edges and singular vertices of the non-manifold polyhedral surface to provide a plurality of connected polyhedral surfaces.

31. A computer program as in claim 30, wherein said cutting code segment operates in accordance with a global cutting procedure.

32. A computer program as in claim 30, wherein said cutting code segment operates in accordance with a global cutting procedure.

33. A computer implemented method for operating on graphics data, comprising steps of:

providing data in a memory of a computer for representing a non-simple mesh comprised of a plurality of polygons bounded by edges and having vertices, the non-simple mesh comprising singular vertices and edges;

analyzing the data that represents the non-simple mesh to detect the presence of the singular edges and vertices;

marking a set of detected singular edges and vertices; and using one of a local cutting procedure or a global cutting procedure for cutting through the set of marked singular edges and vertices of the non-simple mesh.

34. A computer implemented method as in claim 33, wherein the step of marking also marks a set comprised of other edges and vertices, and where the step of cutting also cuts through the set comprised of other edges and vertices.

35. A computer implemented method as in claim 33, wherein the step of using one of the local cutting procedure or the global cutting procedure is followed by a step of transmitting a resulting partition of a surface represented by the non-simple mesh through a data communications network.

* * * * *